US009554338B2

(12) United States Patent
Sun et al.

(10) Patent No.: US 9,554,338 B2
(45) Date of Patent: Jan. 24, 2017

(54) APPARATUS, METHOD, AND SYSTEM FOR UPLINK CONTROL CHANNEL RECEPTION IN A HETEROGENEOUS WIRELESS COMMUNICATION NETWORK

(75) Inventors: Haitong Sun, San Diego, CA (US); Pavan Kumar Vitthaladevuni, San Diego, CA (US); Sharad Deepak Sambhwani, San Diego, CA (US); Jilei Hou, Beijing (CN); Bibhu Prasad Mohanty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 227 days.

(21) Appl. No.: 13/398,249

(22) Filed: Feb. 16, 2012

(65) Prior Publication Data

US 2012/0213092 A1   Aug. 23, 2012

Related U.S. Application Data

(60) Provisional application No. 61/444,264, filed on Feb. 18, 2011.

(51) Int. Cl.
*H04W 52/24* (2009.01)
*H04W 52/40* (2009.01)
(Continued)

(52) U.S. Cl.
CPC ......... *H04W 52/244* (2013.01); *H04W 52/286* (2013.01); *H04W 52/40* (2013.01);
(Continued)

(58) Field of Classification Search
CPC .... H04W 36/20; H04W 36/165; H04W 36/30; H04W 36/385; H04W 52/242; H04W 52/243; H04W 52/244; H04W 52/248
See application file for complete search history.

(56) References Cited

U.S. PATENT DOCUMENTS

2008/0125134 A1* 5/2008 Usuda ................... H04L 1/0002
455/452.1
2008/0130527 A1* 6/2008 Huh et al. ..................... 370/280
(Continued)

FOREIGN PATENT DOCUMENTS

CN       100539459 C    9/2009
JP       2008172376 A   7/2008
(Continued)

OTHER PUBLICATIONS

International Search Report and Written Opinion—PCT/US2012/025606—ISA/EPO—Jul. 27, 2012.
(Continued)

*Primary Examiner* — Joshua Kading
(74) *Attorney, Agent, or Firm* — Darren M. Simon

(57) ABSTRACT

A method and system for improving the reception of uplink transmissions in a heterogeneous wireless communication system includes a high-power node such as a macro-cell and a low-power node such as a femto-cell or pico-cell. To address an uplink imbalance where a nearby low-power node power controls a UE such that uplink transmissions of an HSDPA control channel are poorly received at the serving cell, an RNC can instruct the UE to boost its uplink transmit power, remove the UE from soft handover, or disable power control of the UE by the low-power node. To address inter-cell interference, the RNC can limit the UE transmit power and/or enable the victim cell to suppress the interference. Further, a common control channel can be used to power control UEs outside of the convention set of UEs available for power control.

18 Claims, 16 Drawing Sheets

(51) Int. Cl.
*H04W 52/28* (2009.01)
*H04W 52/14* (2009.01)
*H04W 52/20* (2009.01)
*H04W 52/36* (2009.01)
*H04W 52/48* (2009.01)

(52) U.S. Cl.
CPC .......... *H04W 52/146* (2013.01); *H04W 52/20* (2013.01); *H04W 52/242* (2013.01); *H04W 52/362* (2013.01); *H04W 52/367* (2013.01); *H04W 52/48* (2013.01)

(56) References Cited

U.S. PATENT DOCUMENTS

| | | | |
|---|---|---|---|
| 2008/0166976 A1* | 7/2008 | Rao | 455/69 |
| 2008/0253300 A1* | 10/2008 | Wakabayashi et al. | 370/252 |
| 2009/0143016 A1* | 6/2009 | Li | 455/63.1 |
| 2009/0143070 A1* | 6/2009 | Shu | H04W 28/18 455/450 |
| 2009/0275337 A1* | 11/2009 | Maeda | H04W 36/18 455/442 |
| 2009/0312047 A1* | 12/2009 | Satou et al. | 455/522 |
| 2010/0048237 A1 | 2/2010 | Kishiyama et al. | |
| 2010/0087221 A1* | 4/2010 | Srinivasan et al. | 455/522 |
| 2010/0234032 A1* | 9/2010 | Chun et al. | 455/450 |
| 2010/0272268 A1* | 10/2010 | Sambhwani | H04W 36/0055 380/287 |
| 2011/0039561 A1 | 2/2011 | Narasimha et al. | |
| 2011/0039569 A1 | 2/2011 | Narasimha et al. | |
| 2011/0171992 A1* | 7/2011 | Seo et al. | 455/522 |

FOREIGN PATENT DOCUMENTS

| | | | |
|---|---|---|---|
| JP | 2009302959 A | 12/2009 | |
| JP | 2010500793 A | 1/2010 | |
| WO | 2008019557 A1 | 2/2008 | |
| WO | 2008057017 A1 | 5/2008 | |
| WO | 2009034606 A1 | 3/2009 | |

OTHER PUBLICATIONS

New PostcOm: "Further analysis of MC-HSUPA for LCR TDD", 3GPP Draft; R1-100394 Further Analysis of MC-HSUPA for LCR TDD, 3rd Generation Partnership Project (3GPP), Mobile Competemce Centre ; 650, Route Des Lucioles ; F-06921 Sophia-Antipolis Cedex; France, vol. RAN WG1, No. Valencia, Spain; Jan. 18, 2010, Jan. 12,2010 (Jan. 12, 2010), XP050418052, [retrieved on Jan. 12, 2010] p. 3.

Nokia Corporation et al: "Enhanced Uplink for CELL_FACH in 25.321", 3GPP Draft; R2-081774, 3rd Generation Partnership Project (3GPP), Mobile Competence Centre ; 650, Route Des Lucioles; F-06921 Sophia-Antipolis Cedex; France, vol. RAN WG2, No. Shenzhen, China; Mar. 25, 2008, Mar. 25, 2008 (Mar. 25, 2008), XP050139480, [retrieved on Mar. 25, 2008] section 9.2.6.2.1.

Qualcomm Incorporated: "Introducing further enhancements to CELL_FACH operation", 3GPP Draft R2-110890_INTR0_FURTHER_ENH_CELL_FACH, 3rd Generation Paitnership Project (3GPP), Mobile Competence Centre ; 650, Route Des Lucioles ; F-06921 Sophia-Antipolis Cedex; France, vol. RAN WG2, No. Taipei, Taiwan; Feb. 21, 2011, Feb. 15, 2011 (Feb. 15, 2011), XP050493639, [retrieved on Feb. 15, 2011] p.14, lines 34-45.

TD Tech: "Interference mitigation method of 1.28Mcps TDD Home NodeBSelf Configuration of Home NodeB", 3GPP Draft; R4-101604, 3rd Generation Partnership Project (3GPP), Mobile Competence Centre ; 650, Route Des Lucioles ; F-06921 Sophia-Antipolis Cedex; France, vol. RAN WG4, No. Montreal, Canada; May 10, 2010, May 20, 2010 (May 20, 2010), XP050426610, [retrieved on May 20, 2010] section 2.

* cited by examiner

APPARATUS, METHOD, AND SYSTEM FOR UPLINK CONTROL CHANNEL RECEPTION IN A HETEROGENEOUS WIRELESS COMMUNICATION NETWORK

CROSS-REFERENCE TO RELATED APPLICATIONS

This application claims priority to and the benefit of provisional patent application No. 61/444,264, filed in the United States Patent and Trademark Office on Feb. 18, 2011, the entire content of which is incorporated herein by reference.

BACKGROUND

Field

Aspects of the present disclosure relate generally to wireless communication systems, and more particularly, to interference mitigation in heterogeneous wireless communication systems.

Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

Recently, heterogeneous networks have been an area of intense interest due to their promise of improved wireless coverage in otherwise difficult-to-cover areas like train stations, tunnels, office buildings, and homes. A heterogeneous network includes convention high-power macro-cells, as well as various low-power nodes such as micro-cells, pico-cells, and femto-cells, with varying capacities, coverage areas, and power capabilities. However, with such a deployment where different base stations have different power levels, a number of issues can arise relating to interference between the different base stations, or between user equipment served by one or the other type of base station. Additionally, due to the varying power capabilities of the different types of base stations, power control of uplink transmissions by user equipment by one type of base station can adversely affect reception of those transmissions by another type of base station.

As the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method of wireless communication operable at a user equipment. Here, the method includes monitoring a common control channel in response to determining that a difference between a first path loss corresponding to a transmission received from a first cell and a second path loss corresponding to a transmission received from a second cell is less than a threshold, and adjusting an uplink transmit power in accordance with information on the common control channel.

Another aspect of the disclosure provides a method of wireless communication operable at base station. Here, the method includes transmitting a system information block comprising a scrambling code corresponding to at least one cell in a radio network sub-system and a channelization code corresponding to a common control channel, and transmitting a load control command on the common control channel in response to a determination that inter-cell interference is greater than a threshold. In some examples, the method further includes monitoring the inter-cell interference, wherein the inter-cell interference includes interference caused by uplink transmissions from one or more user equipment that do not include the base station in their active set, and determining that the inter-cell interference is greater than the threshold. In some additional examples, the common control channel is a common E-RGCH that includes an instruction to alter a gain utilized for uplink transmissions.

Another aspect of the disclosure provides a method of wireless communication operable at a network node (e.g., a base station, an RNC, etc.). Here, the method includes determining that a first base station is a victim of inter-cell interference including uplink transmissions from user equipment that does not include the first base station in its active set, and transmitting a signal over a backhaul interface to the first base station to instruct the first base station to suppress the inter-cell interference. In some examples, the determining that the first base station is a victim of inter-cell interference may include at least one of: receiving Node B equipment information from a plurality of base stations including the first base station, and utilizing the received Node B equipment information to determine that the first base station is a victim of inter-cell interference; receiving path loss measurement information corresponding to the first base station and a second base station, the path loss measurement information being sent by at least one user equipment in soft handover between the first base station and the second base station; or receiving inter-cell interference measurement information from the first base station. In another example, the signal to instruct the first base station to suppress the inter-cell interference may include an instruction for the first base station to increase an attenuation at a receiver at the first base station. In another example, the signal to instruct the first base station to suppress the inter-cell interference may include an instruction for the first base station to increase a scheduling target rise-over-thermal at the first base station. In yet another example, the signal to instruct the first base station to suppress the inter-cell interference may include an instruction for the base station to perform inter-cell interference cancellation on the inter-cell interference. In this example, the method may further include transmitting information to the first base station corresponding to at least one user equipment, to enable the first base station to perform inter-cell-interference cancellation of an uplink signal transmitted by the at least one user equipment. Further to this example, the information transmitted to the first base station may include at least one of: an uplink scrambling code utilized by the at least one user equipment; an uplink DPCCH slot format utilized by the at least one user equipment; a frame offset utilized by the at least one user equipment; a puncture limit utilized by the at least one user equipment; E-TFCS information utilized by the at least one user equipment; an E-TTI utilized by the at least one user equipment; an E-DPCCH power offset utilized by the at least one user equipment; a maximum number of uplink DPDCHs utilized by the at least one user equipment; or a maximum set of E-DPDCHs utilized by the at least one user equipment.

Another aspect of the disclosure provides a method of wireless communication operable at a user equipment. Here, the method includes transmitting information relating to a first path loss corresponding to a transmission received from a first cell and a second path loss corresponding to a transmission received from a second cell; receiving, in response to the transmitted information, an instruction relating to an uplink transmit power; and transmitting an uplink transmission in accordance with the instruction relating to the uplink transmit power.

Another aspect of the disclosure provides a method of wireless communication operable at a user equipment. Here, the method includes detecting a rate of decoding errors corresponding to an uplink control channel, increasing an uplink power in response to an unsuccessful decoding of the uplink control channel, and decreasing the uplink power in response to a successful decoding of the uplink control channel.

Another aspect of the disclosure provides a method of wireless communication operable at a network node (e.g., a base station, an RNC, etc.). Here, the method includes detecting that a quality of an uplink control channel transmitted by a first user equipment and received by a first base station is below a threshold, and transmitting an instruction to the first user equipment, the instruction adapted to improve the quality of the uplink control channel. In some examples, the instruction transmitted to the first user equipment may include a power boosting value adapted to boost a power utilized by the first user equipment in transmitting the uplink control channel. Some examples further include determining a difference between an average received signal-to-interference ratio at the first base station and an average target signal-to-interference ratio corresponding to the first user equipment, and determining the power boosting value, wherein the power boosting value corresponds to the determined difference between the average received signal-to-interference ratio at the first base station and the average target signal-to-interference ratio corresponding to the first user equipment. Further, in some examples, the instruction transmitted to the first user equipment may be adapted to remove the first user equipment from soft handover, removing all cells except for the first cell from an active set for the first user equipment.

Another aspect of the disclosure provides a method of wireless communication operable at a network node (e.g., a base station, an RNC, etc.). Here, the method includes detecting that a quality of an uplink control channel transmitted by a first user equipment and received by a first base station is below a threshold, receiving information from a second base station indicating that the second base station transmitted an instruction to the first user equipment to reduce a power of uplink transmissions, and transmitting an instruction to at least one of the second base station or the first user equipment, the instruction adapted to disable power control by the second base station of the first user equipment. In some examples, the transmitting of the instruction may include transmitting a first instruction to the user equipment to instruct the first user equipment to stop following power control commands from the second base station. In another example, the transmitting of the instruction may include transmitting a first instruction to the second base station to instruct the second base station to stop transmitting power-down commands to the first user equipment. In yet another example, the transmitting of the instruction may include transmitting a first instruction to the second base station to disable outer-loop power control of the first user equipment.

Another aspect of the disclosure provides a wireless user equipment that includes at least one processor and a memory coupled to the at least one processor. Here, the at least one processor is configured to monitor a common control channel in response to a determination that a difference between a first path loss corresponding to a transmission received from a first cell and a second path loss corresponding to a transmission received from a second cell is less than a threshold, and to adjust an uplink transmit power in accordance with information on the common control channel.

Another aspect of the disclosure provides a wireless user equipment that includes at least one processor and a memory coupled to the at least one processor. Here, the at least one processor is configured to transmit information relating to a first path loss corresponding to a transmission received from a first cell and a second path loss corresponding to a transmission received from a second cell, to receive, in response to the transmitted information, an instruction relating to an uplink transmit power, and to transmit an uplink transmission in accordance with the instruction relating to the uplink transmit power.

Another aspect of the disclosure provides a wireless user equipment that includes at least one processor and a memory coupled to the at least one processor. Here, the at least one processor is configured to detect a rate of decoding errors corresponding to an uplink control channel, to increase an uplink power in response to an unsuccessful decoding of the uplink control channel, and to decrease the uplink power in response to a successful decoding of the uplink control channel.

Another aspect of the disclosure provides a wireless user equipment that includes means for monitoring a common control channel in response to a determination that a difference between a first path loss corresponding to a transmission received from a first cell and a second path loss corresponding to a transmission received from a second cell is less than a threshold, and means for adjusting an uplink transmit power in accordance with information on the common control channel.

Another aspect of the disclosure provides a wireless user equipment that includes means for transmitting information relating to a first path loss corresponding to a transmission received from a first cell and a second path loss corresponding to a transmission received from a second cell, means for receiving, in response to the transmitted information, an instruction relating to an uplink transmit power, and means for transmitting an uplink transmission in accordance with the instruction relating to the uplink transmit power.

Another aspect of the disclosure provides a wireless user equipment that includes means for detecting a rate of decoding errors corresponding to an uplink control channel, means for increasing an uplink power in response to an unsuccessful decoding of the uplink control channel, and means for decreasing the uplink power in response to a successful decoding of the uplink control channel.

Another aspect of the disclosure provides a computer program product operable at a wireless user equipment, including a computer-readable medium having instructions for causing a computer to monitor a common control channel in response to a determination that a difference between a first path loss corresponding to a transmission received from a first cell and a second path loss corresponding to a transmission received from a second cell is less than a threshold, and instructions for causing a computer to adjust an uplink transmit power in accordance with information on the common control channel.

Another aspect of the disclosure provides a computer program product operable at a wireless user equipment, including a computer-readable medium having instructions for causing a computer to transmit information relating to a first path loss corresponding to a transmission received from a first cell and a second path loss corresponding to a transmission received from a second cell, instructions for causing a computer to receive, in response to the transmitted information, an instruction relating to an uplink transmit power, and instructions for causing a computer to transmit an uplink transmission in accordance with the instruction relating to the uplink transmit power.

Another aspect of the disclosure provides a computer program product operable at a wireless user equipment, including a computer-readable medium having instructions for causing a computer to detect a rate of decoding errors corresponding to an uplink control channel, instructions for causing a computer to increase an uplink power in response to an unsuccessful decoding of the uplink control channel, and instructions for causing a computer to decrease the uplink power in response to a successful decoding of the uplink control channel.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
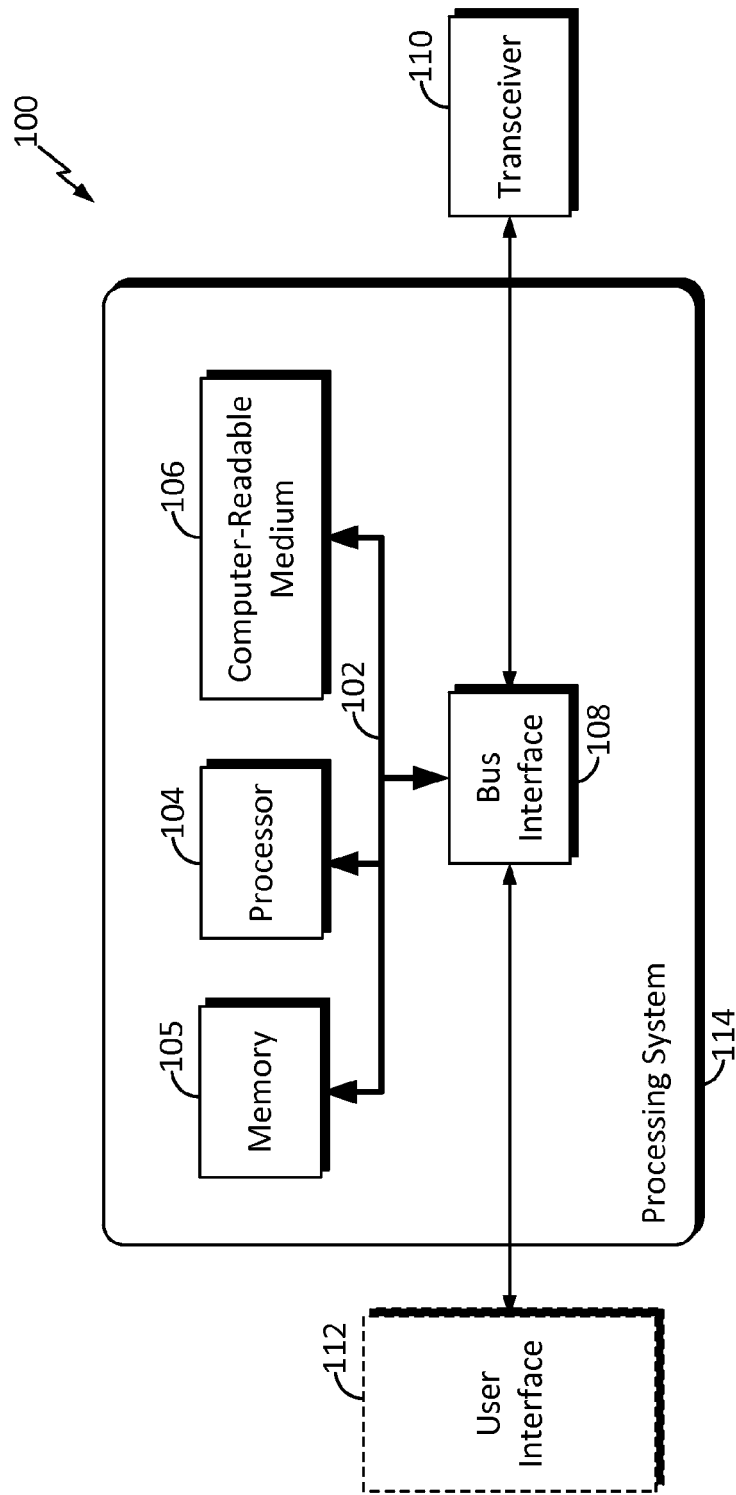
FIG. 1 is a block diagram illustrating an example of a hardware implementation for an apparatus employing a processing system.

FIG. 1 is a conceptual diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The various concepts presented throughout this disclosure may be implemented across a broad variety of telecommunication systems, network architectures, and communication standards. In any particular wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between a mobile user equipment (UE) and the core network, and may include circuit switched and packet switched protocols. The AS provides the lower layers, for signaling between the access network and the UE, and may include a user plane and a control plane. Here, the user plane or data plane carries user traffic, while the control plane carries control information (i.e., signaling).

Figure 2:
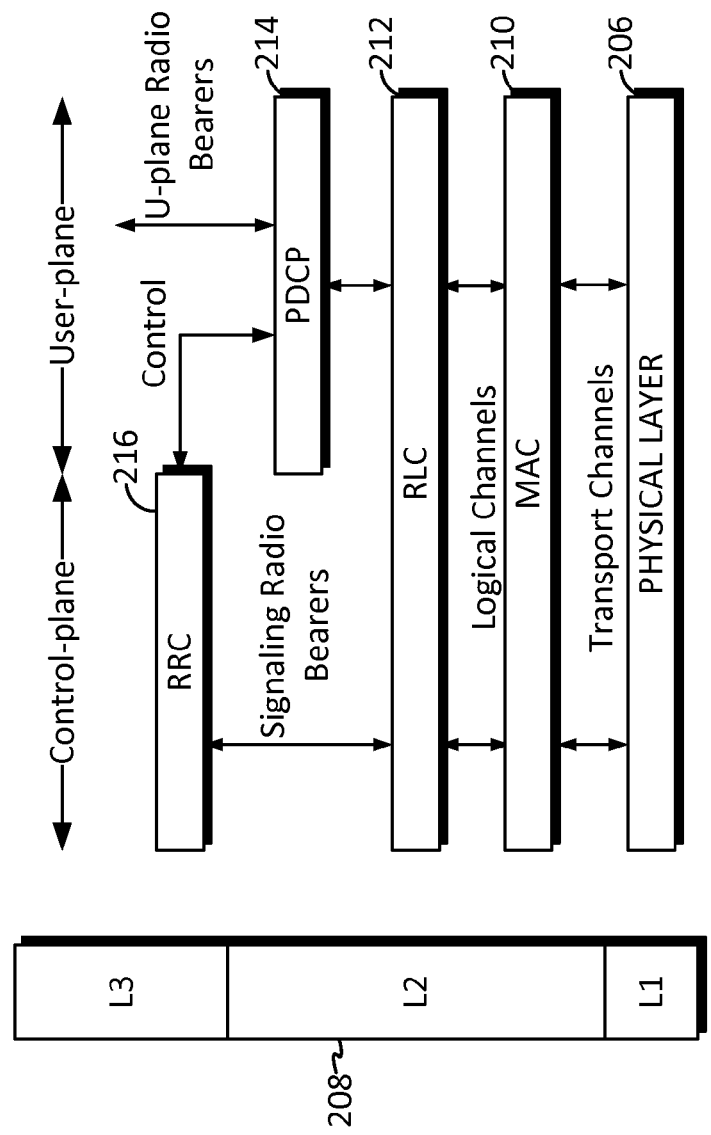
FIG. 2 is a conceptual diagram illustrating an example of a radio protocol architecture for the user and control plane.

Turning to FIG. 2, the AS is shown with three layers: Layer 1, Layer 2, and Layer 3. Layer 1 is the lowest layer and implements various physical layer signal processing functions. Layer 1 will be referred to herein as the physical layer 206. The data link layer, called Layer 2 208, is above the physical layer 206 and is responsible for the link between the UE 210 and Node B 208 over the physical layer 206.

At Layer 3, the RRC layer 216 handles the control plane signaling between the UE 210 and the Node B 208. RRC layer 216 includes a number of functional entities for routing higher layer messages, handling broadcasting and paging functions, establishing and configuring radio bearers, etc.

In the illustrated diagram, the L2 layer 208 is split into sublayers. In the control plane, the L2 layer 208 includes two sublayers: a medium access control (MAC) sublayer 210 and a radio link control (RLC) sublayer 212. In the user plane, the L2 layer 208 additionally includes a packet data convergence protocol (PDCP) sublayer 214. Although not shown, the UE may have several upper layers above the L2 layer 208 including a network layer (e.g., IP layer) that is terminated at a PDN gateway on the network side and an application layer that is terminated at the other end of the connection (e.g., far end UE, server, etc.).

The PDCP sublayer 214 provides multiplexing between different radio bearers and logical channels. The PDCP sublayer 214 also provides header compression for upper layer data packets to reduce radio transmission overhead, security by ciphering the data packets, and handover support for UEs between Node Bs.

The RLC sublayer 212 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 210 provides multiplexing between logical and transport channels. The MAC sublayer 210 is also responsible for allocating the various radio resources (e.g., resource blocks) in one cell among the UEs. The MAC sublayer 210 is also responsible for HARQ operations.

Figure 3:
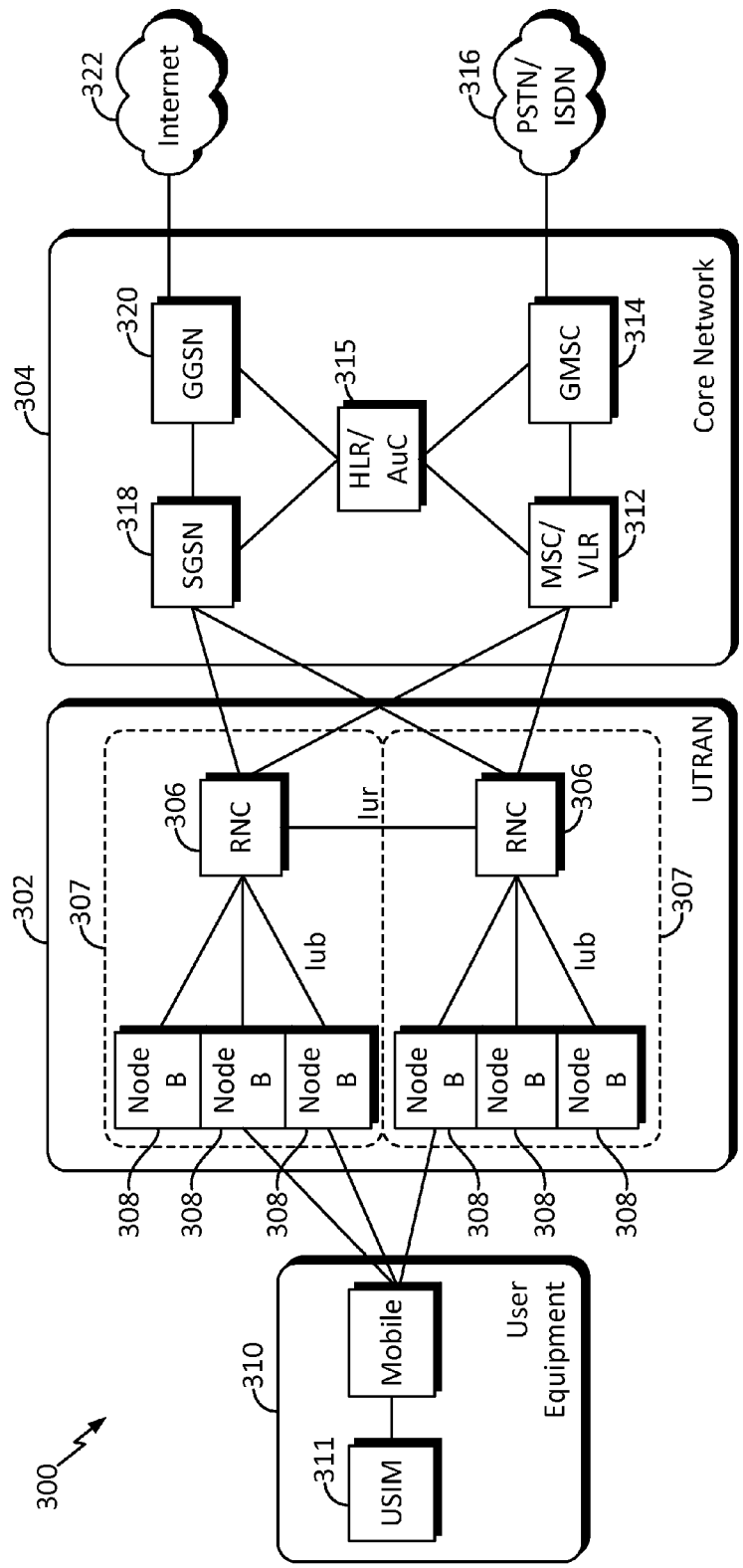
FIG. 3 is a block diagram conceptually illustrating an example of a telecommunications system.

Referring now to FIG. 3, as an illustrative example without limitation, various aspects of the present disclosure are illustrated with reference to a Universal Mobile Telecommunications System (UMTS) network 300. A UMTS network includes three interacting domains: a core network 304, a radio access network (RAN) (e.g., the UMTS Terrestrial Radio Access Network (UTRAN)) 302, and a user equipment (UE) 310. Among several options available for a UTRAN 302, in this example, the illustrated UTRAN 302 may employ a W-CDMA air interface for enabling various wireless services including telephony, video, data, messaging, broadcasts, and/or other services. The UTRAN 302 may include a plurality of Radio Network Subsystems (RNSs) such as an RNS 307, each controlled by a respective Radio Network Controller (RNC) such as an RNC 306. Here, the UTRAN 302 may include any number of RNCs 306 and RNSs 307 in addition to the illustrated RNCs 306 and RNSs 307. The RNC 306 is an apparatus responsible for, among other things, assigning, reconfiguring, and releasing radio resources within the RNS 307. The RNC 306 may be interconnected to other RNCs (not shown) in the UTRAN 302 through various types of interfaces such as a direct physical connection, a virtual network, or the like using any suitable transport network.

The geographic region covered by the RNS 307 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 308 are shown in each RNS 307; however, the RNSs 307 may include any number of wireless Node Bs. The Node Bs 308 provide wireless access points to a core network 304 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 310 may further include a universal subscriber identity module (USIM) 311, which contains a user's subscription information to a network. For illustrative purposes, one UE 310 is shown in communication with a number of the Node Bs 308. The downlink (DL), also called the forward link, refers to the communication link from a Node B 308 to a UE 310 and the uplink (UL), also called the reverse link, refers to the communication link from a UE 310 to a Node B 308.

The core network 304 can interface with one or more access networks, such as the UTRAN 302. As shown, the core network 304 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 304 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 304 supports circuit-switched services with a MSC 312 and a GMSC 314.

In some applications, the GMSC 314 may be referred to as a media gateway (MGW). One or more RNCs, such as the RNC 306, may be connected to the MSC 312. The MSC 312 is an apparatus that controls call setup, call routing, and UE mobility functions. The MSC 312 also includes a visitor location register (VLR) that contains subscriber-related information for the duration that a UE is in the coverage area of the MSC 312. The GMSC 314 provides a gateway through the MSC 312 for the UE to access a circuit-switched network 316. The GMSC 314 includes a home location register (HLR) 315 containing subscriber data, such as the data reflecting the details of the services to which a particular user has subscribed. The HLR is also associated with an authentication center (AuC) that contains subscriber-specific authentication data. When a call is received for a particular UE, the GMSC 314 queries the HLR 315 to determine the UE's location and forwards the call to the particular MSC serving that location.

The illustrated core network 304 also supports packet-switched data services with a serving GPRS support node (SGSN) 318 and a gateway GPRS support node (GGSN) 320. General Packet Radio Service (GPRS) is designed to provide packet-data services at speeds higher than those available with standard circuit-switched data services. The GGSN 320 provides a connection for the UTRAN 302 to a packet-based network 322. The packet-based network 322 may be the Internet, a private data network, or some other suitable packet-based network. The primary function of the GGSN 320 is to provide the UEs 310 with packet-based network connectivity. Data packets may be transferred between the GGSN 320 and the UEs 310 through the SGSN 318, which performs primarily the same functions in the packet-based domain as the MSC 312 performs in the circuit-switched domain.

As discussed above, the UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 302 is based on such DS-CDMA technology and additionally calls for a frequency division duplexing (FDD). FDD uses a different carrier frequency for the uplink (UL) and downlink (DL) between a Node B 408 and a UE 310. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

Figure 4:
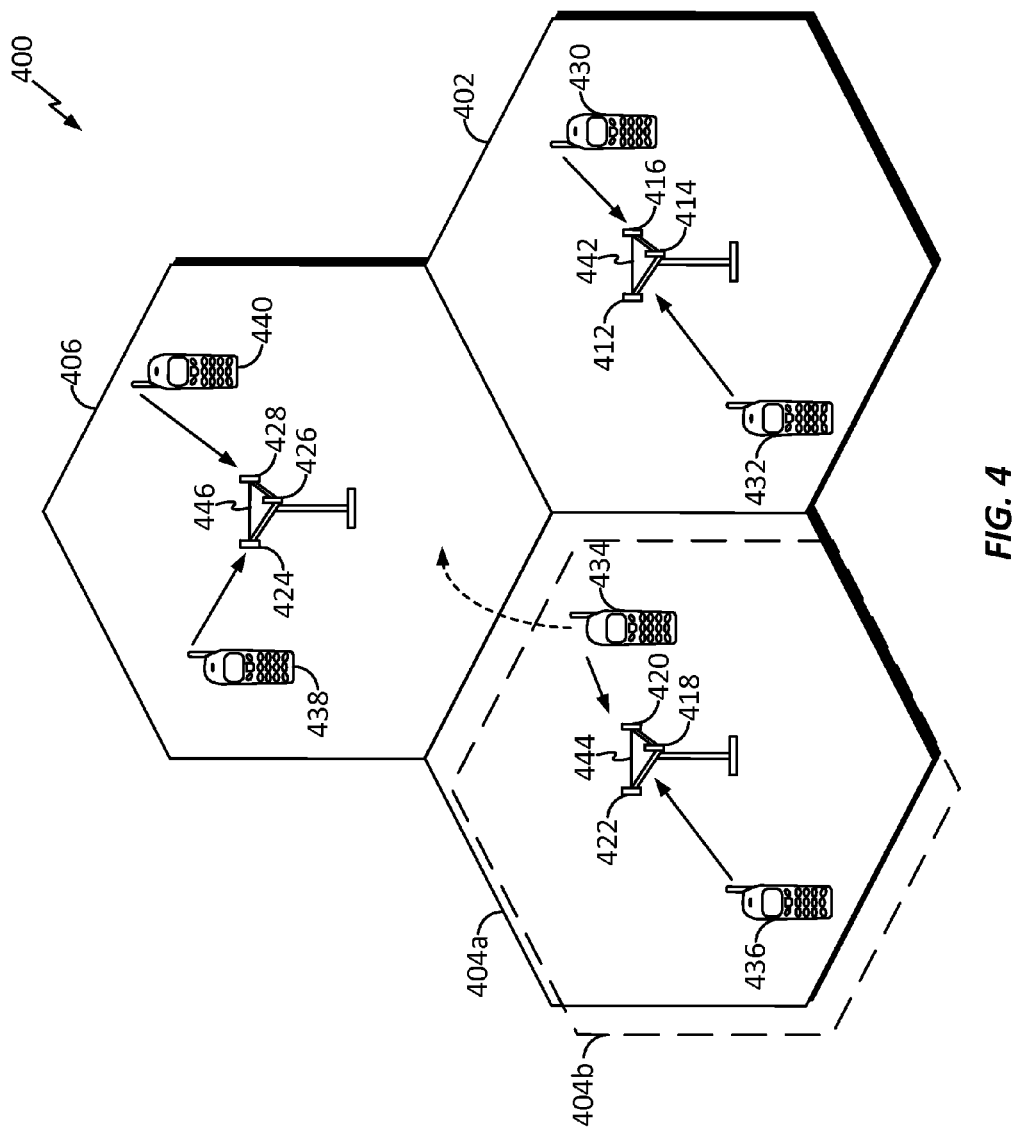
FIG. 4 is a conceptual diagram illustrating an example of an access network.

Referring now to FIG. 4, by way of example and without limitation, a simplified schematic illustration of a RAN 400 in a UTRAN architecture is illustrated. The system includes multiple cellular regions (cells), including cells 402, 404, and 406, each of which may include one or more sectors. Cells may be defined geographically (e.g., by coverage area) and/or may be defined in accordance with a frequency, scrambling code, etc. That is, the illustrated geographically-defined cells 402, 404, and 406 may each be further divided into a plurality of cells, e.g., by utilizing different scrambling codes. For example, cell 404a may utilize a first scrambling code, and cell 404b, while in the same geographic region and served by the same Node B 444, may be distinguished by utilizing a second scrambling code.

In a cell that is divided into sectors, the multiple sectors within a cell can be formed by groups of antennas with each antenna responsible for communication with UEs in a portion of the cell. For example, in cell 402, antenna groups 412, 414, and 416 may each correspond to a different sector. In cell 404, antenna groups 418, 420, and 422 may each correspond to a different sector. In cell 406, antenna groups 424, 426, and 428 may each correspond to a different sector.

The cells 402, 404, and 406 may include several UEs that may be in communication with one or more sectors of each cell 402, 404, or 406. For example, UEs 430 and 432 may be in communication with Node B 442, UEs 434 and 436 may be in communication with Node B 444, and UEs 438 and 440 may be in communication with Node B 446. Here, each Node B 442, 444, and 446 may be configured to provide an access point to a core network 204 (see FIG. 2) for all the UEs 430, 432, 434, 436, 438, and 440 in the respective cells 402, 404, and 406.

During a call with a source cell, or at any other time, the UE 436 may monitor various parameters of the source cell as well as various parameters of neighboring cells. Further, depending on the quality of these parameters, the UE 436 may maintain communication with one or more of the neighboring cells. During this time, the UE 436 may maintain an Active Set, that is, a list of cells to which the UE 436 is simultaneously connected (i.e., the UTRAN cells that are currently assigning a downlink dedicated physical channel DPCH or fractional downlink dedicated physical channel F-DPCH to the UE 436 may constitute the Active Set).

Figure 5:
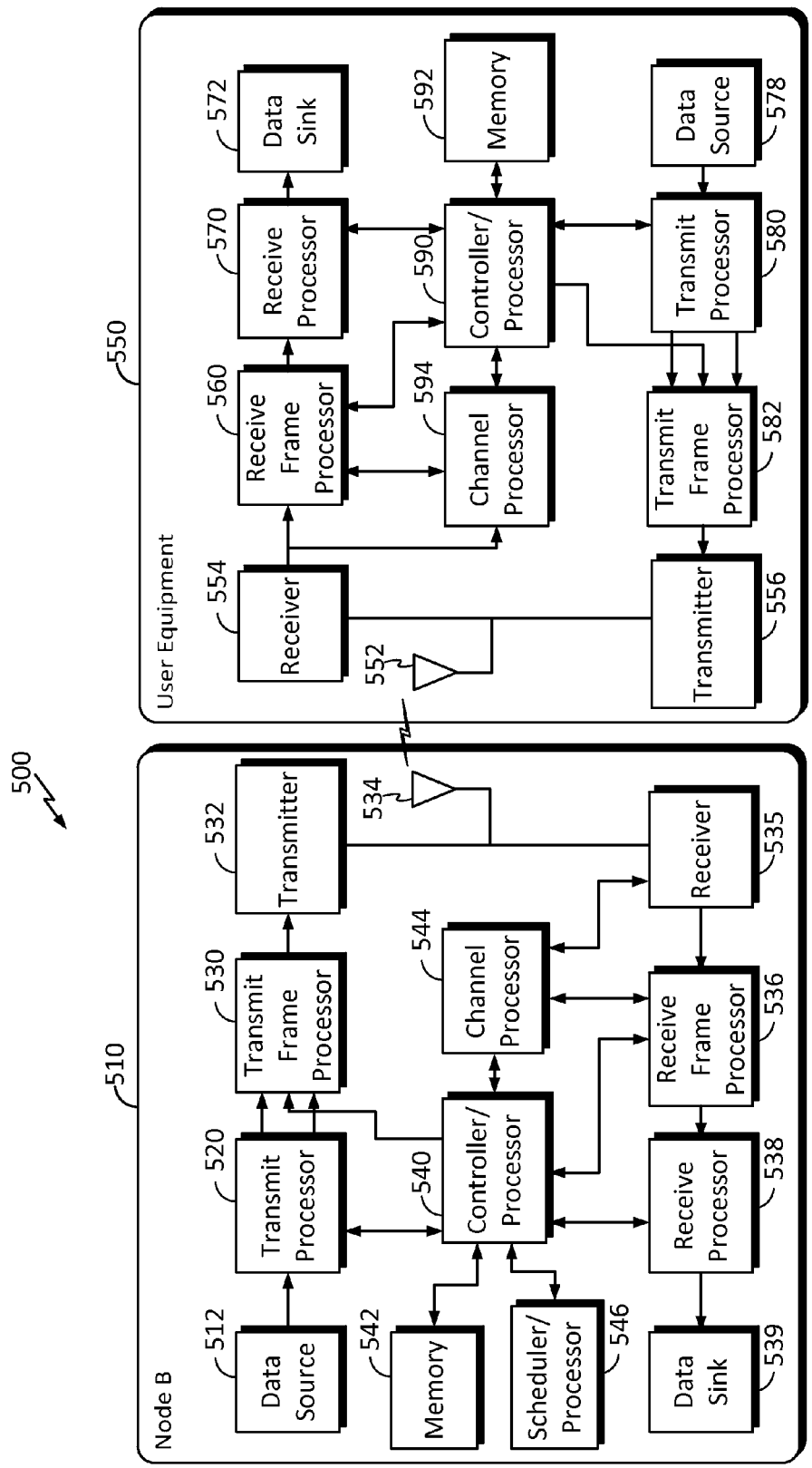
FIG. 5 is a block diagram conceptually illustrating an example of a Node B in communication with a UE in a telecommunications system.

FIG. 5 is a block diagram of an exemplary Node B 510 in communication with an exemplary UE 550, where the Node B 510 may be the Node B 308 in FIG. 3, and the UE 550 may be the UE 310 in FIG. 3. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor 538, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

A high speed packet access (HSPA) air interface includes a series of enhancements to the 3G/W-CDMA air interface between the UE 310 and the UTRAN 302, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

For example, in Release 5 of the 3GPP family of standards, HSDPA was introduced. HSDPA utilizes as its transport channel the high-speed downlink shared channel (HS-DSCH), which may be shared by several UEs. The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-SCCH is a physical channel that may be utilized to carry downlink control information related to the transmission of HS-DSCH. Here, the HS-DSCH may be associated with one or more HS-SCCH. The UE may continuously monitor the HS-SCCH to determine when to read its data from the HS-DSCH and to determine the modulation scheme used on the assigned physical channel.

The HS-PDSCH is a physical channel that may be shared by several UEs and may carry downlink data for the high-speed downlink. The HS-PDSCH may support quadrature phase shift keying (QPSK), 16-quadrature amplitude modulation (16-QAM), and multi-code transmission.

The HS-DPCCH is an uplink physical channel that may carry feedback from the UE to assist the Node B in its scheduling algorithm. The feedback may include a channel quality indicator (CQI) and a positive or negative acknowledgement (ACK/NAK) of a previous HS-DSCH transmission.

One difference on the downlink between Release-5 HSDPA and the previously standardized circuit-switched air-interface is the absence of soft handover in HSDPA. This means that HSDPA channels are transmitted to the UE from a single cell called the HSDPA serving cell. As the user moves, or as one cell becomes preferable to another, the HSDPA serving cell may change. Still, the UE may be in soft handover on the associated DPCH, receiving the same information from plural cells.

In Release 5 HSDPA, at any instance a UE 310 has one serving cell: the strongest cell in the active set, generally according to the UE measurements of $E_c/I_0$. According to mobility procedures defined in Release 5 of 3GPP TS 25.331, the radio resource control (RRC) signaling messages for changing the HSPDA serving cell are transmitted from the current HSDPA serving cell (i.e., the source cell) and not the cell that the UE reports as being the stronger cell (i.e., the target cell).

The above-described channels (HS-PDSCH, HS-SCCH, and HS-DPCCH) in the HSDPA network are transmitted in addition to those corresponding to the release-99 dedicated channel (DCH). The DCH is a transport channel mapped to physical channels including the dedicated physical data channel (DPDCH), which carries information such as user data, and the dedicated physical control channel (DPCCH), a pilot channel that carries control information associated with the DPDCH. Each of the DPDCH and the DPCCH are utilized on both the uplink and the downlink.

Figure 6:
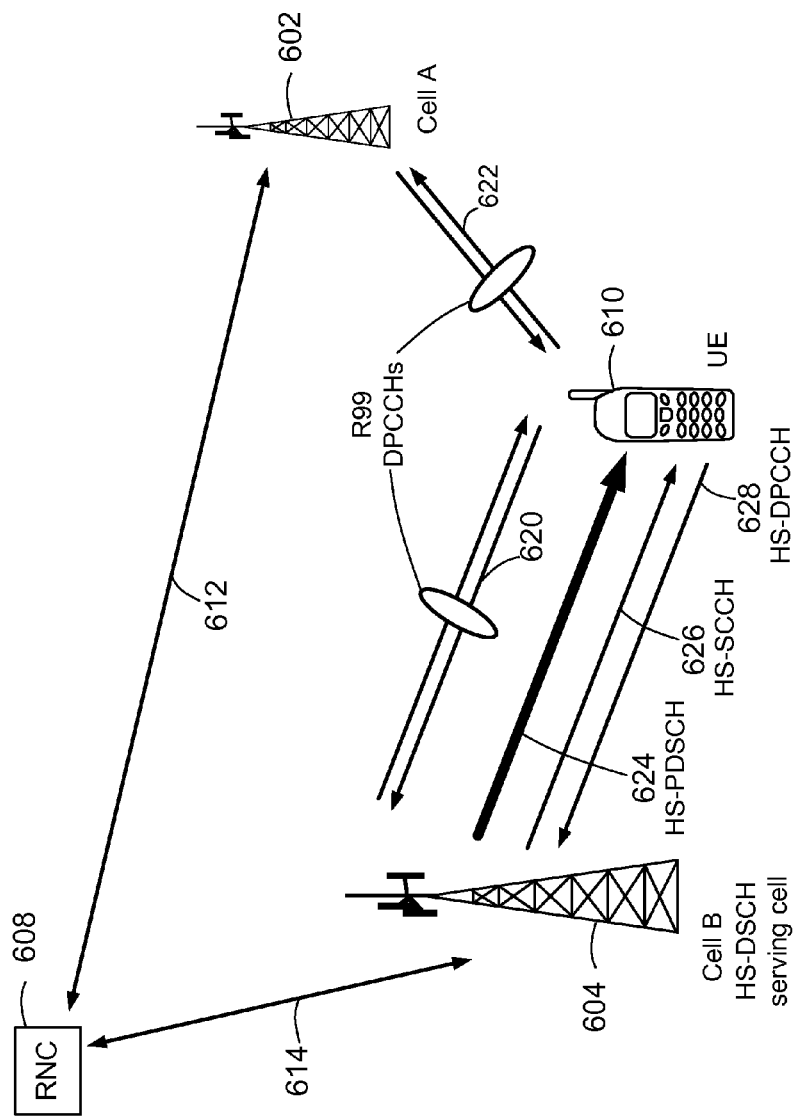
FIG. 6 is a conceptual diagram illustrating a portion of an exemplary heterogeneous network where a UE is in soft handover between a high-power node and a low-power node, with the high-power node acting as a serving cell for HSDPA.

FIG. 6 illustrates a portion of an exemplary heterogeneous access network that includes a high-power Node B 604 and a low-power Node B 602. Here, both the Node Bs 602 and 604 may be the same as the Node B 510 illustrated in FIG. 5. Further, the UE 610 illustrated in FIG. 6 may be the same as the UE 550 illustrated in FIG. 5. As illustrated in FIG. 6, the UE 610 may be in a soft handover. That is, the UE 610 may be located in an overlapping coverage area of two sectors belonging to different Node Bs 602 and 604, such that communications over the release-99 DCH, in particular, the uplink DPCCHs 620 and 622 and their respective corresponding downlink channels, may be in soft handover between the UE 610 and the respective Node Bs 602 and 604, such that communication over these channels takes place concurrently by way of the two air interface channels. This concurrent communication to Node Bs 602 and 604 may be used to coordinate features such as power control and synchronization.

However, with respect to the HSDPA channels HS-PDSCH 624, HS-SCCH 626, and HS-DPCCH 628, soft handover functionality is generally not provided. That is, at any instance, in HSDPA, the UE 610 has only one serving cell, called the serving HS-DSCH cell. The serving HS-DSCH cell is generally the "best" downlink cell, determined in accordance with UE measurements of a pilot channel transmitted by each cell (e.g., the common pilot channel CPICH). As the UE 610 moves, or as downlink channel conditions change, the serving HS-DSCH cell may change in accordance with UE reports of the best CPICH. Here, the downlink HS-PDSCH 624 and HS-SCCH 626 are transmitted by the serving HS-DSCH cell 604, and the uplink HS-DPCCH 628 is received and decoded by the serving HS-DSCH cell 604.

One aspect of any wireless communication network is power control of uplink transmission power. In the uplink, the transmission power of the UEs determines the amount of interference to the adjacent cells, and the received power determines the amount of interference to other UEs in the same cell. In a UMTS network utilizing W-CDMA, an inner loop power control and an outer loop power control work together to manage uplink transmission power. Inner loop power control, also frequently referred to as fast power control, includes the determination of a signal-to-interference ratio (SIR) at the Node B, and if the interference is above a target SIR, the Node B may transmit a power control command to the UEs that have that Node B in their Active Set, requesting those UEs to lower their transmission power. Outer loop power control includes the determination of uplink quality at the RNC, and based on the determined quality, the target SIR (used by inner loop power control) is sent to the Node Bs. Thus, the target SIR can go up and down over time, in accordance with one or more characteristics of the uplink quality, e.g., the uplink packet error rates.

In an HSDPA network, the uplink transmission power of the HS-DPCCH 628 is determined relative to the power level on the DPCCH. That is, an offset relative to the DPCCH power is utilized by the UE 610 to determine the power for transmission of the HS-DPCCH 628. This offset can be referred to as a control-to-power offset (C2P), and is generally one selected from three different offsets: a Delta_ACK, a Delta_NACK, or a Delta_CQI. That is, depending on which information element is being transmitted on the HS-DPCCH, one of these offsets may be selected to be the C2P for an uplink transmission. Here, various issues may arise corresponding to the setting of the transmission power of the HS-DPCCH 628. For example, the HS-DPCCH utilizes a portion of the uplink transmission power, and therefore, setting the power too high can impact the link budget for other uplink transmissions from the UE 610. Similarly, setting the power too high can cause a potentially unnecessary noise rise, interfering with uplink transmissions from other UEs. On the other hand, setting the HS-DPCCH power too low can affect HSDPA performance if the transmissions are not properly received at the Node B.

In particular, power control and interference problems can arise and be particularly problematic in a heterogeneous network. That is, in many access networks such as the network illustrated in FIG. 6, one or more of the cells may be provided by a typical macro-cell, which may be considered a high-power node, and one or more of the cells may be provided by a low-power node such as a femto-cell, a pico-cell, etc. that may be deployed within the coverage area of the macro-cell. For example, in the illustration in FIG. 6, the serving cell for the UE 610 is a high-power node or macro-cell 604, and a second cell, which is in soft handover for the UE 610, is a low-power node 602. The low-power node can be any one of several examples of low-power nodes. For example, a femto-cell, sometimes called a home Node B in 3GPP standards, is a small base station or Node B typically configured for use in a home or office. The femto-cell may typically utilize a high-speed Internet connection, such as a cable or DSL connection for its backhaul connection to the core network. A pico-cell (or micro-cell) is a relatively small and low-cost base station typically deployed to extend coverage from that available from a macro-cell deployment, e.g., into buildings, malls, train stations, etc., where coverage from macro-cells may otherwise be lacking.

Figure 7:
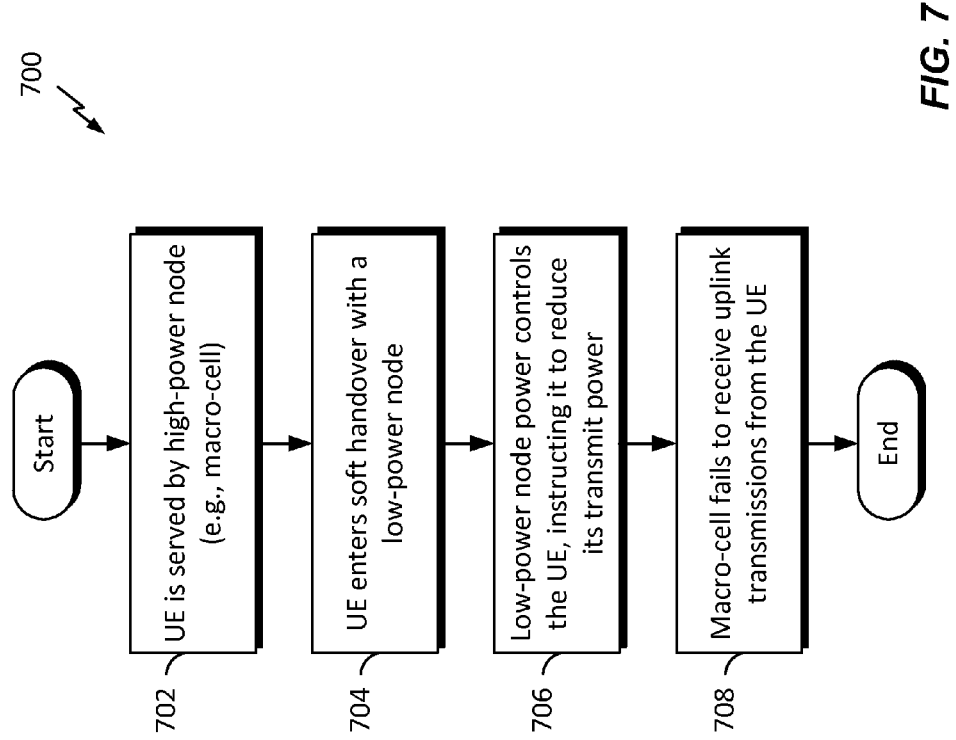
FIG. 7 is a flow chart illustrating a particular problem in the configuration of FIG. 6 where an uplink power imbalance can result in poor reception of an uplink control channel at the HSDPA serving cell.

FIG. 7 is a flow chart that illustrates one particular issue relating to the reliability of the uplink HS-DPCCH 628, which can frequently arise in a heterogeneous network when the serving HS-DSCH cell 604 is a high-power node such as a macro-cell, and the UE 610 is in soft handover with a low-power node 602. In the illustrated example, in block 702 a UE 610 may establish a connection with a high-power node such as a macro-cell 604, such that the macro-cell 604 is the serving cell for the UE 610. In block 704, the UE 610 may enter into soft handover with a low-power node 602. Here, the low-power node 602 is a member of the Active Set for the UE 610. Here, it may be the case that the UE 610 is physically very close to the low-power node 602, but because of the high power of the downlink transmitted by the high-power node 604, the UE 610 is served by the more distant high-power node. In this case, the uplink power received by the low-power node 602 may be much higher than the uplink power received by the high-power node 604. Thus, in block 706 the low-power node 602 may send a power control command to the UE 610, bringing the UE transmit power down. That is, the non-serving cell 602 in soft handover can send power control commands to the UE 610 over the DPCCH 622.

In this case, when the UE 610 reduces its uplink transmit power, in block 708 the transmissions of the HS-DPCCH 628 received at the macro-cell 604 may be very weak, such that the reliability of the HS-DPCCH suffers. That is, the macro-cell 604 may fail to receive the uplink HS-DPCCH transmissions from the UE 610. Because the uplink control channel HS-DPCCH 628 carries such information as the downlink ACK/NACK and the CQI for the serving HS-DSCH cell, performance of the HS link can suffer due to this uplink imbalance.

FIGS. 8-11 illustrate some aspects of the present disclosure adapted to address this link imbalance issue as illustrated in FIGS. 6 and 7. That is, each of FIGS. 8-11 illustrates a different process that may be utilized alone or in conjunction with other ones of the illustrated processes to address the link imbalance issue described above and shown in FIGS. 6 and 7.

In one example, the RNC 608 can adaptively adjust an HS-DPCCH control-to-pilot ratio (C2P), which is a power offset that the UE utilizes for determining the power of the HS-DPCCH transmission relative to the DPCCH, which carries a pilot signal. That is, when the RNC 608 detects the above-described uplink imbalance, it may instruct the UE 610 to increase its uplink transmit power to compensate for the imbalance, and to improve the likelihood that the HS-DPCCH can be decoded reliably at the serving Node B.

Figure 8:
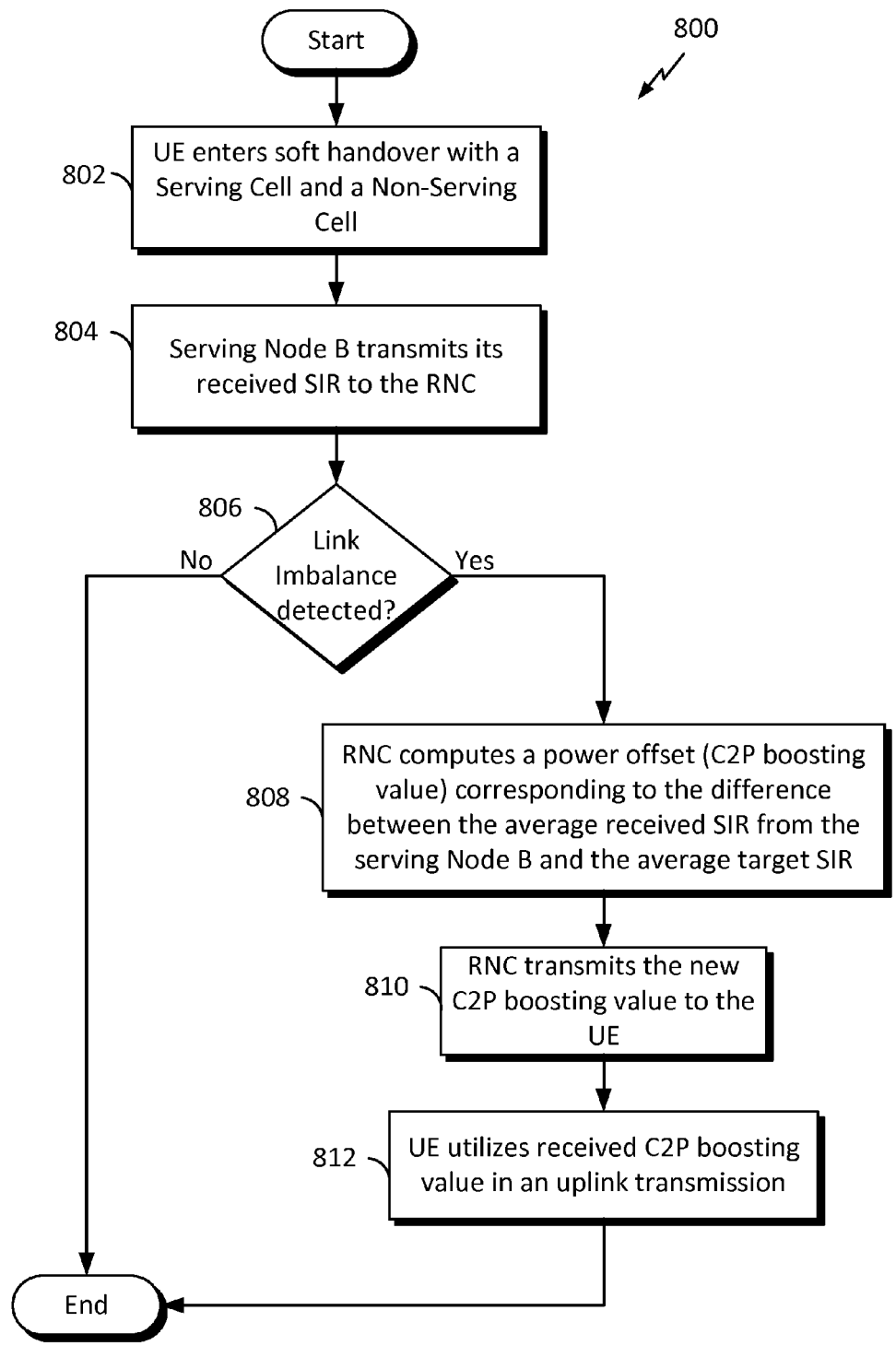
FIG. 8 is a flow chart illustrating an exemplary process for boosting a power used by a UE for an uplink control channel.

FIG. 8 is a flow chart illustrating an exemplary process 800 as described above, with steps that may be operable at the RNC 608, the serving Node B 604, and the UE 610. At block 802, the UE 610 may enter into a soft handover with a serving cell and a non-serving cell. For example, as described above, the UE 610 may have as its serving cell a high-power node such as a macro-cell, and the UE 610 may have a low-power node, such as the low-power node 602 in its Active Set. Here, as described above, for the purpose of outer loop power control, the RNC 608 may maintain a target SIR for uplink transmissions from the served UE 610. Further, each Node B in the UE's Active Set may report a quality of an uplink control channel, e.g., a received SIR for uplink transmissions from the UE 610. For example, in a Node B such as the Node B 510 (see FIG. 5), when the receiver 535 receives uplink transmissions from the UE such as the uplink HS-DPCCH 628, one or more of the receive processor 538, the channel processor 544, and/or the controller/processor 540 may determine a received SIR corresponding to the actual uplink transmissions received. Further, the controller/processor 540 may store measurements of the received SIR in the memory 542, such that, over time, an average received SIR may be calculated in accordance with a plurality of measurements of the received SIR.

In a conventional network, because multiple Node Bs may receive and decode uplink transmissions from the UE 610, with the fast inner-loop power control it is generally the case that the Node B that receives the best uplink signal from the UE 610 may power control the UE 610 to reduce its uplink transmission power, so that the received SIR at that Node B is at or near the target SIR. The issue here may be that, due to the C2P offset, the power of the HS-DPCCH 628 may be reduced so much that it cannot be properly decoded at the serving Node B 604. Thus, to address this issue, in an aspect of the present disclosure, either one or both of the serving Node B 604 and/or the RNC 608 may detect that a quality of an uplink control channel, such as the HS-DPCCH 628, is below a threshold. To this end, at block 804 the serving Node B 604 may transmit its received SIR to the RNC 608. In the case of the uplink imbalance as described above, if the low-power node 602 causes the UE 610 substantially to reduce its uplink power, the received SIR at the serving Node B 604 may be substantially below the target SIR. For example, a threshold amount below the target SIR may be established, such that when the received SIR is below this threshold, it may indicate that there is a link imbalance. In this case, at block 806, the RNC 608 may detect a link imbalance. For example, the RNC 608, receiving over time a series of detected SIR measurements over a backhaul interface from the serving Node B 604, may compute an average detected SIR. Further, as a part of the outer loop power control, the target SIR may vary, and in an aspect of the present disclosure, the RNC 608 may compute an average target SIR corresponding to a time average of the target SIR. In an aspect of the present disclosure, the difference between the average received SIR at the serving Node B 604 and the average target SIR may be utilized to determine a link imbalance condition, e.g., where the difference is greater than some threshold value.

In response to the link imbalance condition, in an aspect of the present disclosure, one of the RNC 608 and/or the serving Node B 604 may transmit an instruction to the UE 610, the instruction adapted to improve the quality of the uplink control channel. To this end, in block 808, the RNC 608 may compute a power offset, e.g., a C2P boosting value, corresponding to the difference between the average received SIR at the serving Node B 604 and the average target SIR. That is, the difference between the average received SIR at the serving Node B 604 and the average target SIR may be quantized such that incremental values of the difference can correspond to incremental increases in the C2P boosting value. In another example, rather than sending a particular boosting quantity for the C2P boosting value, the signaling of the C2P boost may simply include a power up command or a power down command, similar to the power up and power down commands utilized by conventional uplink power control algorithms.

At block 810, the RNC 608 may transmit an instruction to the UE 610 to alter its uplink transmission power, the instruction including the determined C2P boosting value to the UE 610. Responsive to this instruction, at block 812 the UE 610 may apply the received C2P boosting value to boost the power of a subsequent uplink transmission. For example, the C2P value corresponding to the one of the Delta_ACK, Delta_NACK, or Delta_CQI may be boosted according to the received C2P boosting value, thereby altering the power of the HS-DPCCH transmission by the UE 610 and improving the likelihood it will be successfully received at the serving Node B 604.

In a variation on this example, rather than being centered at the RNC 608, the serving Node B 604 may perform the calculations corresponding to the C2P boost. That is, in this example, in block 804, rather than the serving Node B 604 transmitting to the RNC 608 the received SIR that the serving Node B 604 detected, the RNC 608 may transmit the target SIR to the serving Node B 604. Thus, in this example, in block 806 the serving Node B 604 may determine whether the link imbalance condition exists in accordance with a difference between the average received SIR and the average target SIR, in the same fashion described above where the RNC 608 made this determination. Here, in block 810, the serving Node B 604 may transmit the new C2P boosting value to the UE 610, as described above.

In another example, the UE 610 may automatically increase its uplink transmit power when it detects a high level of uplink HS-DPCCH decoding errors. That is, in an aspect of the present disclosure, the UE 610 may measure a duplicate transmission rate, e.g., a number of duplicate packets transmitted by the serving Node B 604 on the HS-PDSCH 624 over a given time. As discussed above, if the HS-DPCCH 628, which carries the HARQ acknowledgment messages, is not properly received by the serving Node B 604 (considered by the Node B as a discontinuous transmission or DTX), or if the serving Node B 604 receives a NACK on the HS-DPCCH 628, the serving Node B 604 generally retransmits the corresponding packet on the HS-PDSCH 624. Thus, in some cases, even though the UE 610 transmits an ACK indicating a properly received and decoded packet, if the ACK is not received at the Node B, the packet may nevertheless be retransmitted. Here, when the UE 610 receives the retransmission, it may determine that the retransmitted packet corresponds to a duplicate transmission, and accordingly update the duplicate transmission rate. This duplicate transmission rate may correspond to an ACK to NACK/DTX rate, which may be measured in some conventional UEs according to UMTS standards.

Figure 9:
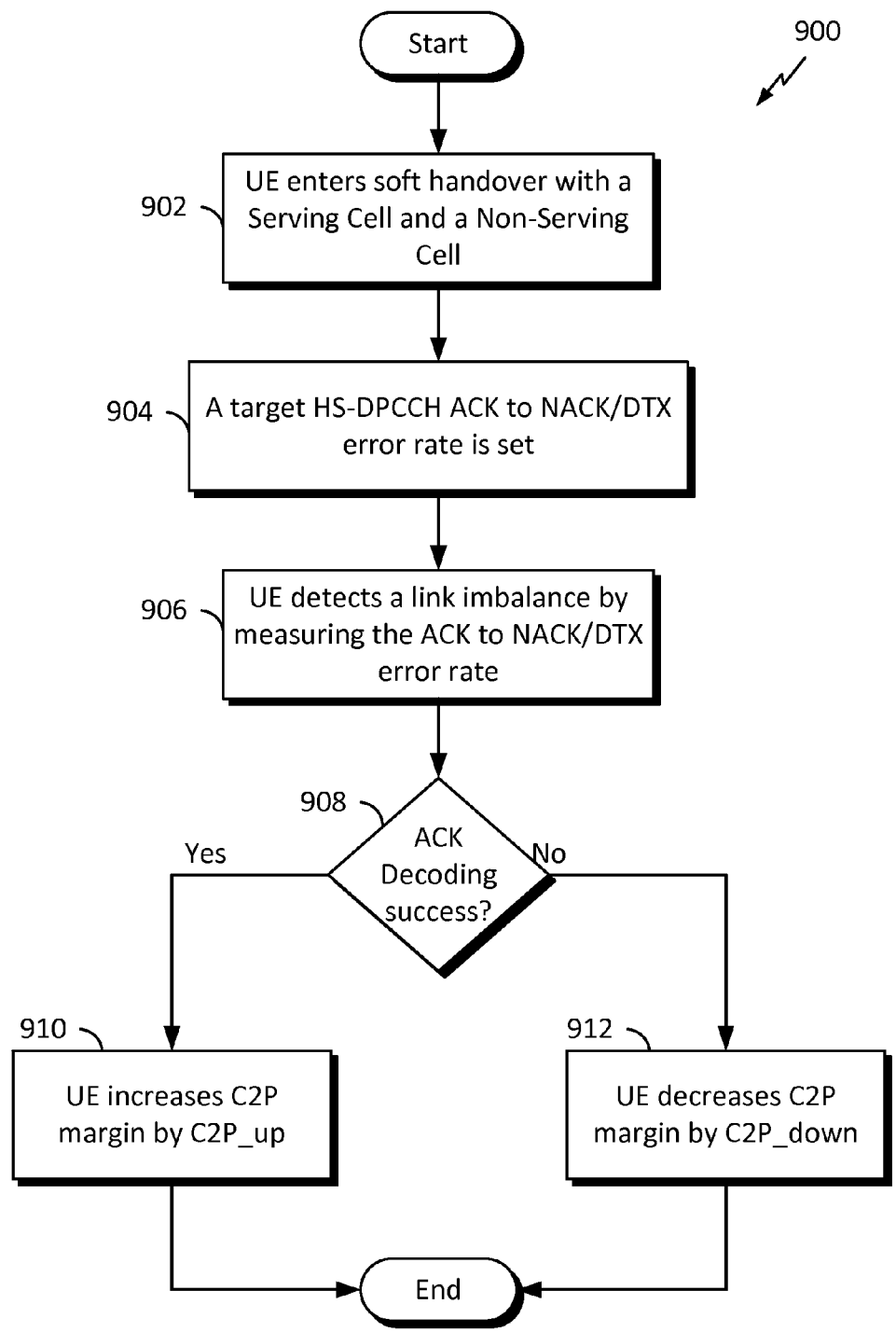
FIG. 9 is a flow chart illustrating an exemplary process of adjusting a power used by a UE for an uplink control channel in accordance with a target error rate.

FIG. 9 is a flow chart illustrating an exemplary process 900 as described above wherein the UE 610 automatically adjusts its uplink transmit power in accordance with the level of HS-DPCCH decoding errors. In block 902, the UE 610 may enter into soft handover with a serving cell and a non-serving cell. For example, as described above, the UE 610 may have as its serving cell a high-power node such as a macro-cell, and the UE 610 may have a low-power node in its Active Set. In block 904, a nominal ACK to NACK/DTX error rate is set, either being determined by the UE 610 or determined by the RNC 608 and signaled to the UE 610.

Meanwhile, the UE 610 may receive downlink packets on the HS-PDSCH 624 and transmit the corresponding ACK/NACK on the HS-DPCCH 628 for each of the received packets. Over time, as described above, the UE 610 may track the ACK to NACK/DTX error rate corresponding to retransmissions of packets that were properly received and decoded and already acknowledged. In block 906, the UE 610 detects the link imbalance, i.e., by detecting a rate of decoding errors corresponding to an uplink control channel (e.g., the HS-DPCCH 628). For example, the UE 610 may detect that the ACK to NACK/DTX error rate is at or greater than the nominal or target ACK to NACK/DTX error rate set in block 904. At this time, the UE 610 can automatically adjust its uplink transmit power, e.g., by increasing or decreasing the C2P ratio as needed so as not to exceed, or to maintain the nominal ACK to NACK/DTX error rate. For example, in block 908 the UE 610 may determine whether an ACK transmitted on the uplink HS-DPCCH was decoded successfully at the serving Node B. That is, an ACK decoding success can be determined if the acknowledged packet is not retransmitted before a packet having a subsequent sequence number is transmitted. Similarly, an ACK decoding failure can be determined if the acknowledged packet is retransmitted by the Node B. Thus, in an aspect of the present disclosure, in accordance with an unsuccessful decoding of the HS-DPCCH, the UE 610 may increase the uplink power. Further, in accordance with a successful decoding of the HS-DPCCH, the UE 610 may decrease the uplink power. For example, in the case of the ACK decoding failure, in block 912 the UE 610 can decrease the C2P margin by an amount designated C2P_down; and in the case of the ACK decoding success, in block 910 the UE 610 can increase the C2P margin by an amount designated C2P_up. In various aspects of the disclosure, the values C2P_down and C2P_up can be set to any suitable value for maintaining the ACK to NACK/DTX error rate to a desired value. In one example, the ratio between C2P_up and C2P_down can be set to C2P_up/C2P_down=(1−TER)/TER, where TER is the target error ratio, that is, the nominal or target ACK to NACK/DTX error rate set in block 904.

In another example, the RNC 608 may detect the imbalance, i.e., that the HS-DPCCH is unreliable. In this case, due to the possibility that cells in the UE's Active Set are instructing the UE to reduce its uplink transmit power too far, such that the HS-DPCCH is unreliable, the RNC 608 may simply remove the UE 610 from soft handover. In this way, the other Node B that is instructing the UE 610 to reduce its transmit power would no longer be capable of power controlling the UE 610.

Figure 10:
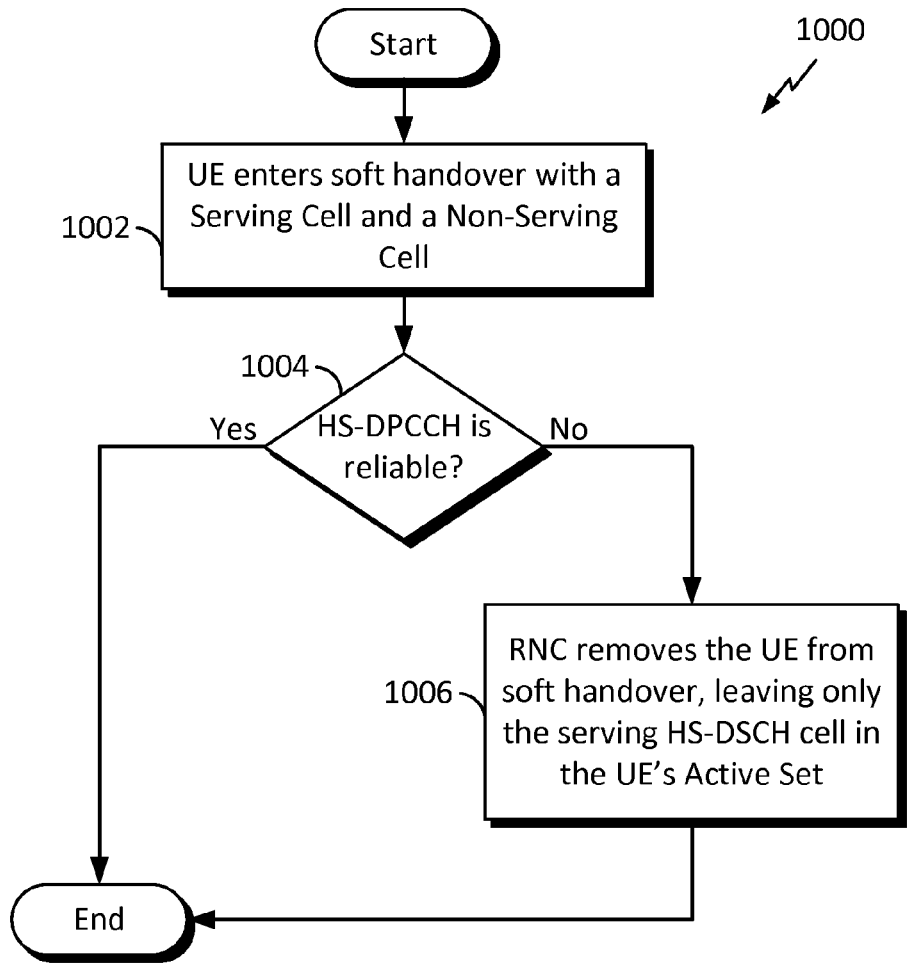
FIG. 10 is a flow chart illustrating an exemplary process of removing a UE from soft handover to prevent non-serving cells from power-controlling the UE.

FIG. 10 is a flow chart illustrating an exemplary process 1000 as described above wherein the RNC may remove the UE 610 from soft handover in the case of an unreliable HS-DPCCH. In block 1002, the UE 610 may enter into soft handover with a serving cell and a non-serving cell. For example, as described above, the UE 610 may have as its serving cell a high-power node such as a macro-cell, and the UE 610 may have a low-power node in its Active Set. In an aspect of the present disclosure, a network node (e.g., the RNC 608 and/or the serving Node B 604) may detect that a quality of an uplink control channel (e.g., the HS-DPCCH 628) is below a threshold. For example, in block 1004, the RNC 608 may determine whether the HS-DPCCH 628 transmitted by the UE 610 and received by the serving Node B 604 is reliable. For example, the serving Node B 604 may begin to have finger tracking problems; or the serving Node B 604 may detect that the pilot SINR is very low, e.g., below a threshold. In any case, the serving Node B may inform the RNC 608 that the uplink transmitted by the UE 610 has become unreliable. In this case, responsive to this determination, the RNC 608 may transmit an instruction to the UE 610, the instruction adapted to improve the quality of the uplink control channel. For example, in block 1006, the RNC 608 may transmit an instruction to the UE 610 to remove the UE 610 from soft handover, leaving only the serving HS-DSCH cell in the UE's Active Set. For example, the RNC 608 may utilize RRC signaling to communicate suitable mobility events to remove each Node B other than the serving Node B 604 from the UE's Active Set. In this way, the UE 610 would not be power-controlled by other non-serving Node Bs and the uplink can become more reliably received by the serving Node B 604.

In another example, a somewhat less drastic measure than removing the UE from soft handover may be taken by the RNC 608. That is, rather than completely removing the UE 610 from soft handover, the RNC 608 may transmit an instruction to the UE 610 to disable the power control of the problematic Node B, that is, the Node B instructing the UE 610 to reduce its uplink transmit power.

Figure 11:
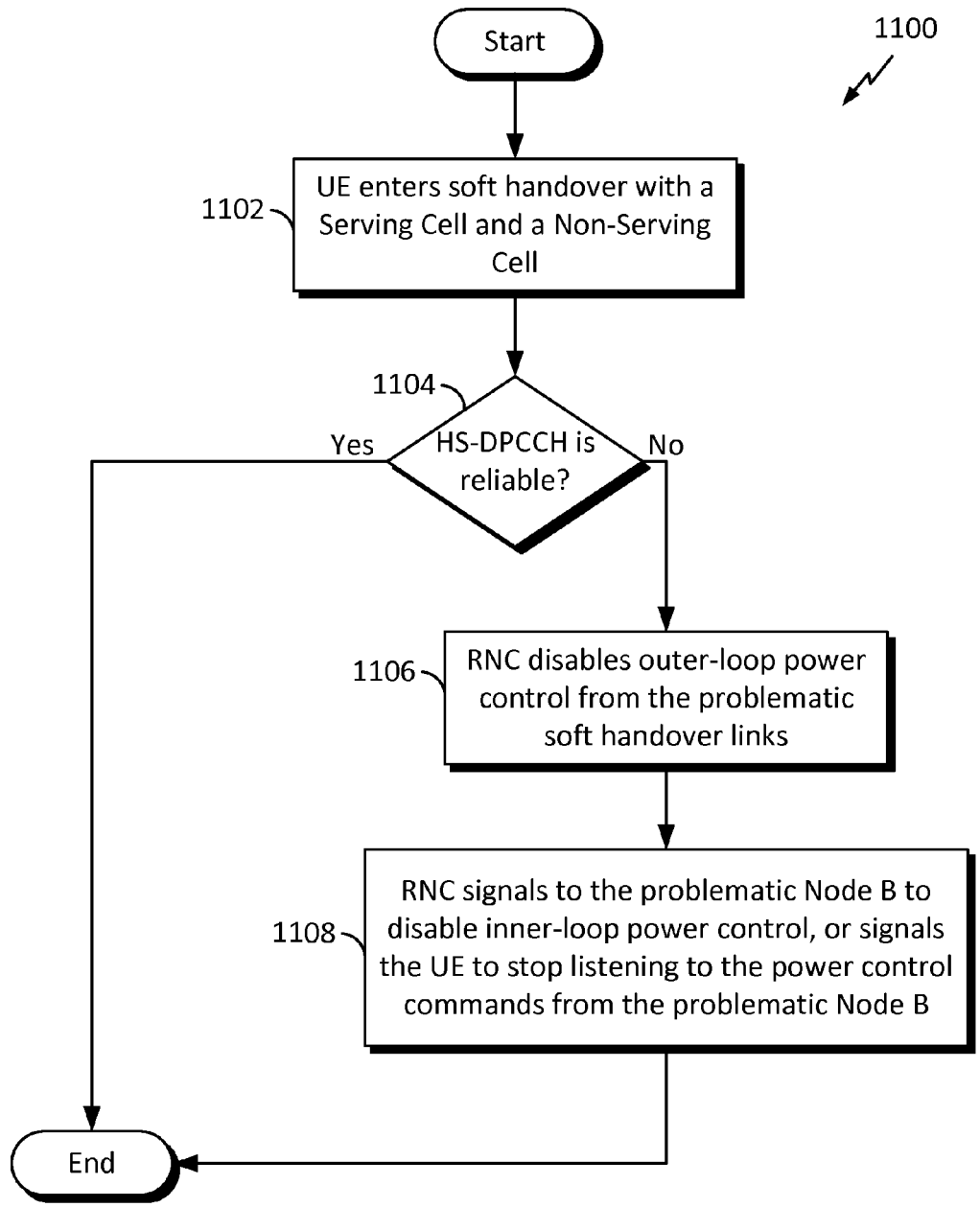
FIG. 11 is a flow chart illustrating an exemplary process of disabling power control of a UE to prevent non-serving cells from power-controlling the UE.

FIG. 11 is a flow chart illustrating an exemplary process 1100 as described above wherein the RNC 608 may disable the power control of the problematic Node B. In block 1102, the UE 610 may enter into soft handover with a serving cell and a non-serving cell. For example, as described above, the UE 610 may have as its serving cell a high-power node such as a macro-cell, and the UE 610 may have a low-power node in its Active Set. In an aspect of the present disclosure, the RNC 608 may detect that a quality of an uplink control channel (e.g., the HS-DPCCH 628) is below a threshold. For example, in block 1104, the RNC 608 may determine whether the HS-DPCCH transmitted by the UE 610 is reliable. For example, the serving Node B 604 may begin to have finger tracking problems; or the serving Node B 604 may detect that the pilot SINR is low, e.g., below a suitable threshold. In any case, the serving Node B may inform the RNC 608 that the uplink transmitted by the UE 610 has become unreliable. Further, a second base station, e.g., the low-power node 602 in the Active Set of the UE 610, may transmit information to the RNC 608 indicating that the second base station transmitted an instruction to the UE 610 to reduce a power of its uplink transmissions. In this case, the RNC 608 may transmit an instruction to at least one of the second base station and/or the UE 610, the instruction adapted to disable power control by the second base station of the UE 610. For example, in block 1106, the RNC 608 may transmit an instruction to disable the outer loop power control from the problematic soft handover links. For example, the RNC 608 may cease updating the target SIR at the selected Node B based on the decoding results from the selected Node B in soft handover with the UE 610. In block 1108, the RNC 608 may disable inner loop power control of the UE by the selected Node B. For example, the RNC 608 may transmit a signal to the selected Node B to prevent the selected Node B from transmitting power control commands to the UE 610, or to instruct the selected Node B only to transmit power-up commands, and not to transmit power-down commands, to the UE 610. In another example, the RNC 608 may transmit a signal to the UE 610 instructing the UE 610 to stop listening to power control commands from the selected Node B.

Figure 12:
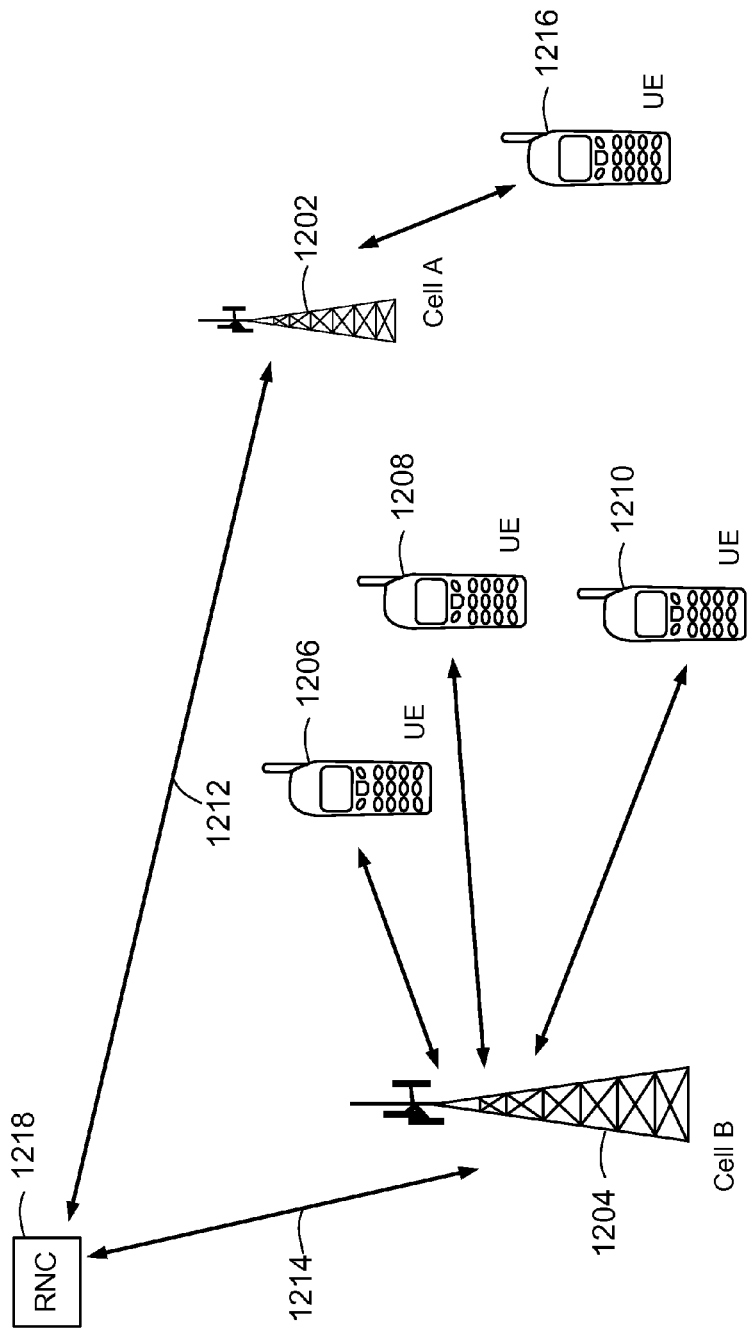
FIG. 12 is a conceptual diagram illustrating a portion of an exemplary heterogeneous network where uplink transmission interference can occur between different cells.

Another particular issue that can arise in a heterogeneous network relates to a high level of interference that can occur between a high-power node and a low-power node. For example, referring now to FIG. 12, a heterogeneous network may include a high-power node such as a macro-cell 1204 and a low-power node 1202 such as a femto-cell or pico-cell, both controlled by an RNC 1218 over respective backhaul connections 1212 and 1214. In this network, both the high-power node 1204 and the low-power node 1202 may be the same as the Node B 510 illustrated in FIG. 5. Further, each of the UEs 1206, 1208, 1210, and 1216 illustrated in FIG. 12 may be the same as the UE 550 illustrated in FIG. 5.

Here, the high-power node 1204, by virtue of its high power downlink, may attract a large number of UEs for which it may be the serving cell. In some cases, this may result in a relatively large number of UEs 1206, 1208, and 1210, each of which has the high-power node 1204 as their serving cell, being in very close proximity to the low-power node 1202, but not having the low-power node 1202 in their Active Set. In this case, when these UEs 1206, 1208, and 1210 send data on uplink transmissions to the high-power node 1204, they may cause a very high level of interference on the uplink for the low-power node 1202, and yet, because the low-power node 1202 is not in the Active Set of those UEs 1206, 1208, and 1210, the low-power node 1202 may have no way to power control those UEs or limit those UEs' scheduling grants. Thus, the low-power node 1202 may be a victim of large, uncontrollable interference resulting from a nearby macro-cell, and uplink transmissions from any UE 1216 served by the low-power node 1202 may suffer.

By the same token, the small-power node 1202 may only serve a relatively small number of UEs 1216 as compared to a nearby high-power node 1204. Here, each UE 1216 served by the low-power node 1202 may receive a very generous scheduling grant, and may thereby transmit an uplink at a very high power. In this case, when those UEs 1216 are not in soft handover with the nearby high-power node 1204, they may cause a high level of interference to the neighboring high-power node 1204, degrading the uplink throughput of other UEs 1206, 1208, and 1210 that are served by the victim high-power node 1204.

FIGS. 13-16 illustrate some aspects of the present disclosure adapted to address these interference issues as described above in relation to FIG. 12. That is, each of FIGS. 13-16 illustrates a different process that may be utilized alone or in conjunction with other ones of the illustrated processes to address the interference issue described above in relation to FIG. 12.

In one example, when the low-power node 1202 detects conditions indicating a high level of inter-cell interference, it may transmit a common control signal requesting nearby UEs to lower their transmit power. Here, only those UEs that detect a significant power difference between the high-power node 1204 and the low-power node 1202 will listen to the common control signal and actually lower their transmit power.

Figure 13A:
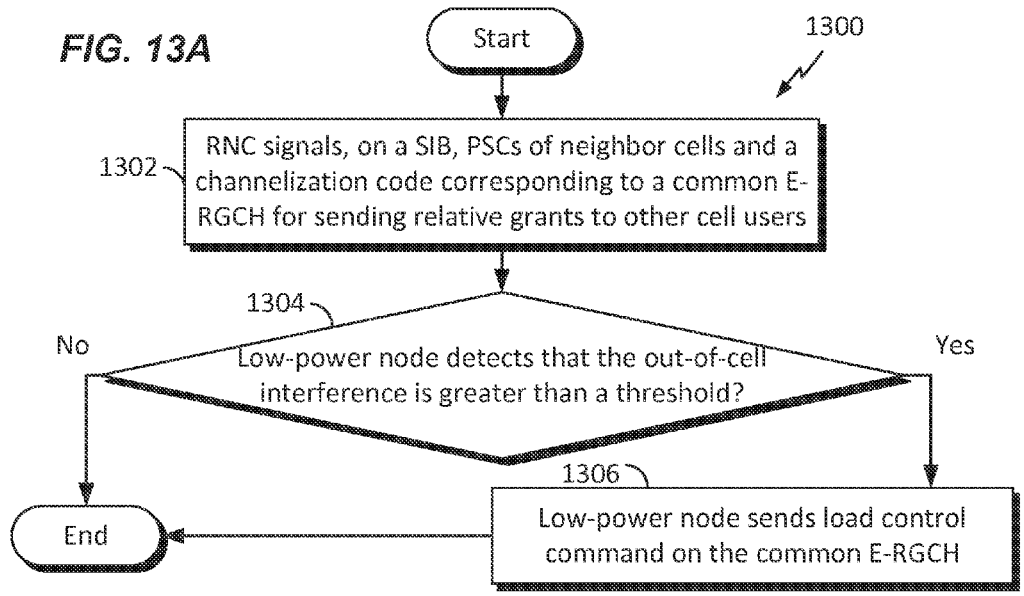
FIGS. 13A-13B are flow charts illustrating exemplary processes of utilizing a common control channel to enable power control of UEs that are outside the set of UEs conventionally available for uplink power control.
Figure 13B:
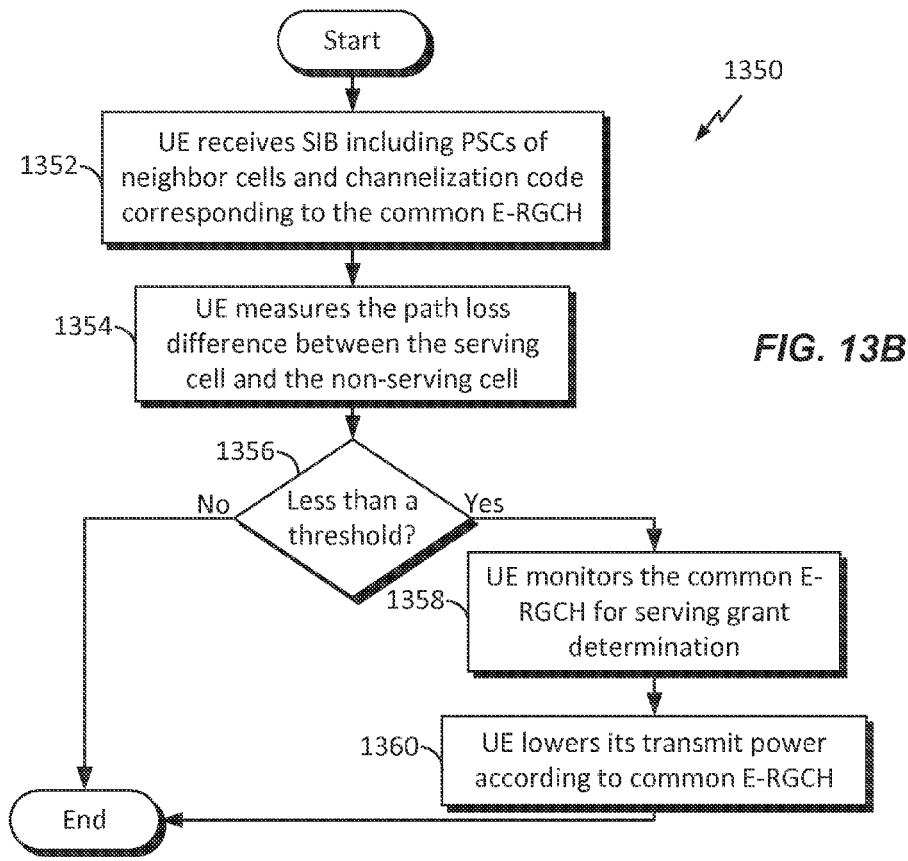

FIGS. 13A-13B are flow charts respectively illustrating exemplary processes 1300 and 1350 as described above, which utilize a common control channel to mitigate interference in a heterogeneous network. Here, process 1300 illustrates process steps operable in the access network, e.g., at the RNC 1218 and the low-power Node B 1202; and process 1350 illustrates process steps operable at an interfering UE, e.g., at UE 1206. The two processes 1300 and 1350 may operate in parallel in some examples.

According to exemplary process 1300, at block 1302 the RNC 1218 may broadcast information relating to the common control channel over system information blocks (SIBs). That is, the RNC 1218 may transmit the information over respective backhaul interfaces (e.g., the Iub interface) to various Node Bs coupled to the RNC 1218 to be broadcasted by the Node Bs to proximate UEs. Here, the information relating to the common control channel to be included in the SIB broadcast may include the primary scrambling codes (PSCs) of a set of neighbor cells in the radio network sub-system (RNS) coupled to the RNC 1218, where the size of the set of neighbor cells may be limited to any suitable size. Further, the information to be included in the SIB broadcast may include a channelization code for the common control channel, for enabling UEs that receive the SIB to decode that channel. The common control channel may be a common E-RGCH, utilized to send relative grants to users of other cells. Here, the common E-RGCH is a different channel than the conventional common E-RGCH, which is an enhanced uplink (EUL) channel utilized to send relative grants to intra-cell users. That is, the UE may receive more than one relative grant on a plurality of common E-RGCH transmissions, and the UE generally takes the lowest relative grant it receives In block 1304, the low-power node 1202 may detect whether inter-cell interference Ioc is greater than a threshold. That is, the low-power node may continuously or periodically measure a level of interference (Io) on the channel utilized for uplink transmissions. This interference can be characterized as Io=Ior+Ioc+No, where Ior refers to the total received energy from the UEs that have the low-power node 1202 in their Active Set, Ioc refers to inter-cell interference, i.e., interference caused by uplink transmissions from UEs that do not include the low-power node 1202 in their Active Set, and No is the noise floor. Thus, the low-power node 1202 may be capable of separating out the Ioc component of the measured interference and determining whether this component is greater than some suitable threshold.

If Ioc is greater than the threshold, as determined in block 1304, then in block 1306 the low-power node 1202 may transmit a suitable load control command on the common E-RGCH, for which the channelization code is broadcasted in block 1302. In this way, as described in further detail below, UEs that do not include the low-power node 1202 in their Active Set, such that the low-power node 1202 may not be capable of transmitting the power control command on the DPCCH, may still be power controlled and may reduce their uplink transmit power in response to the load control command on the common E-RGCH.

Process 1350 shows the corresponding procedure for a UE 1206 that does not include the low-power node 1202 in its Active Set. As described above, it may be the case that one or more UEs 1206 may have a high-power node 1204 as their serving cell, which may cause an inordinate amount of interference to a proximate low-power node 1202. Process 1350 works in conjunction with process 1300 to provide a way for the victim low-power node 1202 to reduce the power of the interfering UEs 1206 even though they do not include the low-power node 1202 in their Active Set.

In block 1352, the UE 1206 may receive the system information block (SIB) broadcasted from one or more Node Bs, as described above in block 1302. Here, the SIB may include one or more of a scrambling code (e.g., a PSC) corresponding to one or more of neighbor cells, and/or a channelization code corresponding to the common E-RGCH that may carry load control commands.

Having the PSCs of the neighbor cells, such as the low-power node 1202, in block 1354 the UE 1206 may measure a path loss difference between its serving cell 1204 and a non-serving cell, e.g., the low-power node 1202. That is, a path loss may be determined for each of the serving cell and the neighbor cell. Path loss can be determined in any suitable manner as known to those skilled in the art. In one example, each Node B may broadcast an information element that indicates the power level that Node B utilizes for pilot transmissions. Here, when the UE receives the pilot transmission from that Node B, it may take a measurement of the received power and determine a difference between the received power and the transmitted power to determine the path loss. In another example, the UE may report a measurement of a received pilot power to the Node B, such that the Node B, which knows what power it utilized for the pilot transmission, can itself take the difference between the transmitted power and the received power at the UE to determine the path loss. In any case, the path loss corresponds to the difference between the transmitted power at the Node B and the received power at the UE.

Once the path loss is determined for the UE's serving cell as well as the neighbor cell for which the PSC was received in block 1352, the UE may compute a difference between the two. If the difference between the path loss from a non-serving cell and the path loss from a serving cell is less than a suitable threshold amount (i.e., the path loss from the interfering cell is very close to or lower than the path loss from the serving cell), then this can indicate that the low-power node is nearby the UE, and suffering from an inordinate amount of uplink interference from the UE. Thus, in block 1356, the UE 1206 may determine whether the measured path loss difference is less than a suitable threshold. Here, the threshold may be predetermined and programmed into the UE 1206, or may be configured at a network node such as the RNC 1218 and transmitted to the UE 1206, e.g., utilizing RRC signaling. When the path loss difference is less than the threshold, this can indicate that the victim cell, e.g., the low-power node 1202 is suffering from interference from UEs that it cannot power control. That is, responsive to a determination that a difference between a first path loss corresponding to a transmission received from a first cell and a second path loss corresponding to a transmission received from a second cell is less than a threshold, the UE 1206 may begin to monitor a common control channel. That is, if in block 1356 the UE 1206 determines that the path loss difference between its serving cell 1204 and the non-serving cell 1202 is less than the threshold, then in block 1358 the UE 1206 may begin to monitor the common E-RGCH, as configured in the SIB received in block 1352, for the purpose of determining whether to modify its serving grant. In block 1360, when the UE 1206 receives the load control command transmitted by the victim Node B 1202, the UE 1206 may accordingly adjust its uplink transmit power in accordance with information on the common E-RGCH. For example, the UE 1206 may lower its transmit power, thereby reducing the interference caused to the victim low-power node 1202.

In another example, to mitigate interference to a macro-cell caused by a UE served by a low-power node, that UE may signal to the RNC information relating to the path loss of the macro-cell and the path loss to its serving cell. Here, the RNC can determine if the path loss difference is too low, and in this case, can signal to the UE to reduce its transmit power, thereby reducing the interference caused to the victim macro-cell.

Figure 14:
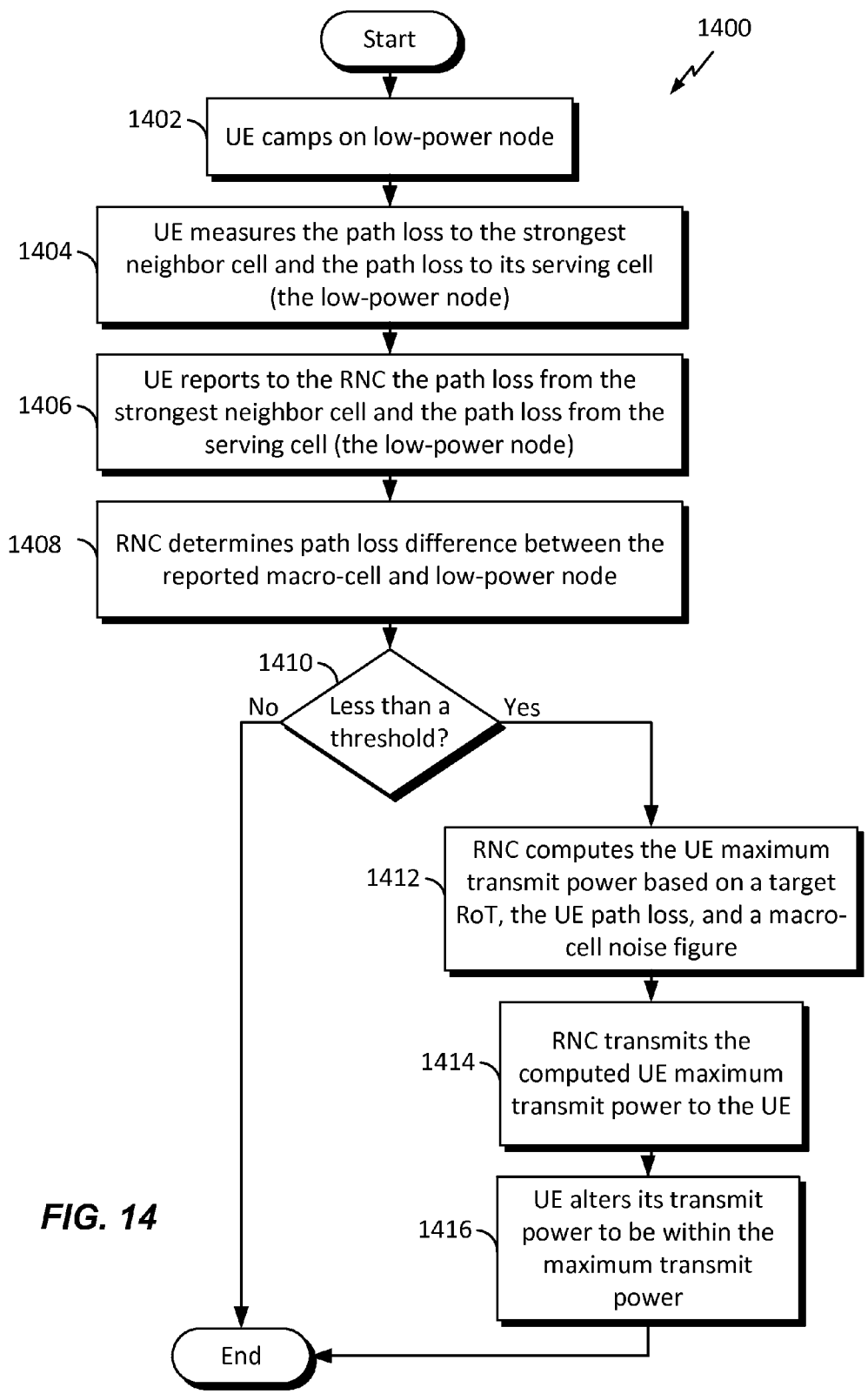
FIG. 14 is a flow chart illustrating an exemplary process of lowering a maximum transmit power of an interference-causing UE.

FIG. 14 is a flow chart illustrating an exemplary process 1400 as described above, wherein the RNC 1218 utilizes path loss information provided by the UE 1216 to power control the UE 1216 as needed to reduce interference to a neighbor macro-cell 1204. In block 1402, the UE may camp on the low-power node 1202, and begin a session with the low-power node 1202. During the communication session, in block 1404, the UE 1216 may measure the path loss to its strongest neighbor cell, which may be the macro-cell 1204, and the path loss to its serving cell 1202. In block 1406, the UE 1216 may report to the RNC 1218 the measured path loss for the strongest neighbor cell and the serving cell.

Using the received information provided by the UE 1216 in block 1406, in block 1408, the RNC 1218 may determine a path loss difference between the reported neighbor cell 1204 and the low-power node 1202, and in block 1410, the RNC 1218 may determine whether this path loss difference is less than a suitable threshold. If the path loss difference is determined to be less than the threshold, this generally indicates a high level of interference at the low-power node, and in this case, the process may proceed to block 1412. In block 1412 the RNC 1218 may compute a maximum transmit power for the UE 1216. Here, the maximum transmit power may be based on one or more of a target rise over thermal noise (RoT), the UE path loss, and/or a macro-cell noise figure.

Here, the RoT is a parameter that the RNC 1218 may determine, which may be linked to the transmit power for any particular UE. That is, RoT corresponds to the total received power at a Node B. If a UE's transmit power increases, the RoT at the Node B is increased; and accordingly, if the UE's transmit power decreases, the RoT at the Node B is decreased. Thus, the RNC can compute a lowered maximum transmit power for the UE in accordance with a target RoT value. Further, the path loss may be the number provided by the UE in block 1406, and the noise figure for the macro-cell may be a figure provided to the RNC 1218 by the macro-cell 1204.

In block 1414, the RNC 1218 may transmit the computed maximum transmit power to the UE 1216, and in block 1416, the UE 1216 may alter its transmit power to be within the maximum transmit power signaled by the RNC 1218 in block 1414. Thus, In another example, when the RNC detects that the low-power node is suffering from a high amount of interference from one or more UEs camped on a neighbor macro-cell, the RNC may request the low-power node to artificially attenuate its uplink receive signal, e.g., by utilizing noise padding, or may request the low-power node to increase its scheduling target RoT.

Here, noise padding, or increasing the attenuation of the uplink receive signal may be accomplished by modifying a circuit value in the receive circuit at the Node B to reduce the power of received uplink signals. Here, by increasing the attenuation at the receiver, the low-power node can reduce the inter-cell interference without substantially affecting uplink transmissions from UEs that are served by the low-power node. That is, the UEs served by the low power node may increase their uplink transmit power to compensate for the increased attenuation at the low-power node.

Similarly, by increasing the Node B's scheduling target RoT, the UEs that are served by the Node B can each increase their respective uplink transmit powers, to better enable their signals to get through to the Node B despite the inter-cell interference. That is, because the low-power node does not have the capability to conventionally power control the inter-cell UEs that are causing the high level of interference, if the target RoT were increased it would effectively be the UEs served by the low-power node that resultantly increase their transmit power, thus reducing the effects of the inter-cell interference.

Figure 15:
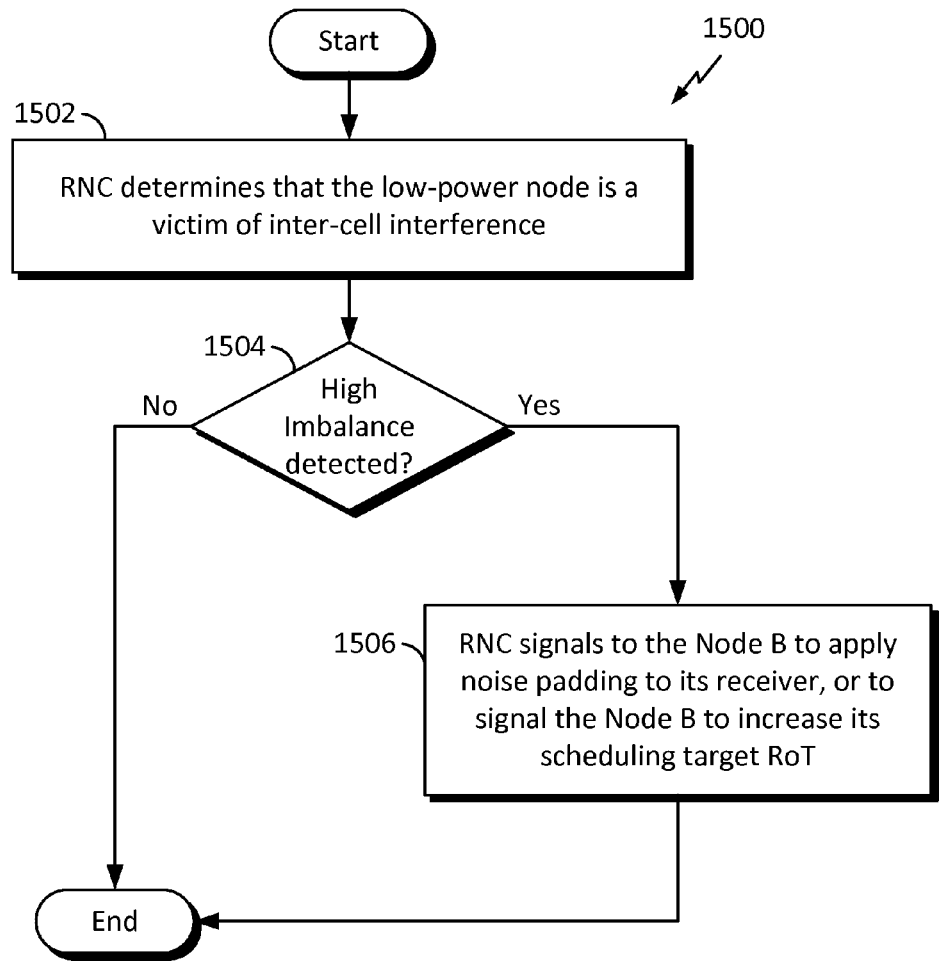
FIG. 15 is a flow chart illustrating an exemplary process of suppressing inter-cell interference at a Node B by applying noise padding or increasing a scheduling target rise-over-thermal.

FIG. 15 is a flow chart illustrating an exemplary process 1500 as described above wherein the RNC 1218 may mitigate interference at a low-power node 1202 by requesting the low-power node 1202 to attenuate its uplink receive signal or to increase its scheduling target RoT. Here, a base station may determine that it is a victim of inter-cell interference that includes uplink transmissions from one or more UEs that do not include the base station in their Active Set. That is, in block 1502, the RNC 1218 may detect an inter-cell interference condition between the low-power node and the high-power node. For example, the RNC 1218 may receive Node B equipment information, such as an uplink sensitivity or a noise figure provided to the RNC 1218 by the respective Node Bs, that indicates that the low-power node 1202 is suffering from a high amount of interference. In another example, the RNC 1218 may receive measurement information such as path loss difference between the low-power node 1202 and the macro-cell 1204 from one or more UEs in soft handover between the low-power node 1202 and the macro-cell 1204. In yet another example, the RNC 1218 may utilize inter-cell interference Ioc on the low-power node 1202, as determined by the low-power node 1202 and signaled to the RNC 1218. In any case, in block 1504, the RNC 1218 may determine whether an uplink imbalance, resulting in an inordinate amount of interference at the low-power node 1202, is occurring. In the case that a high level of uplink imbalance is detected, then in block 1506 the RNC 1218 may transmit information over a backhaul interface to the low-power node 1202 instructing the low-power node 1202 to suppress the inter-cell interference, e.g., by applying a suitable noise padding to its receiver, or to signal the low-power node 1202 to increase its scheduling target RoT (e.g., its load). In this fashion, the low-power node 1202 can reduce the effects of interference caused by UEs camped on a neighbor cell that cannot be conventionally power-controlled by the low-power node 1202.

In another example, to address inter-cell interference at a low-power node, the RNC can enable the low-power node to perform inter-cell interference cancellation. That is, inter-cell interference cancellation (ICIC) is one way to reduce inter-cell interference by utilizing various radio resource management methods.

Here, with knowledge of characteristics of the interfering signal, an advanced ICIC-capable receiver can reduce the problematic effects of inter-cell interference. That is, a conventional Node B may utilize intra-cell interference cancellation, wherein the Node B is capable of suppressing interference from other UEs that are served by that Node B. However, for such interference cancellation techniques, in a conventional system it is generally not possible to suppress the interference from UEs that are not served by the Node B, since the Node B lacks the UE uplink transmission information. Thus, in an aspect of the present disclosure the relevant information of those out-of-cell UEs may be provided to the victim Node B, so that it can utilize the interference cancellation techniques on those out-of-cell UEs.

Figure 16:
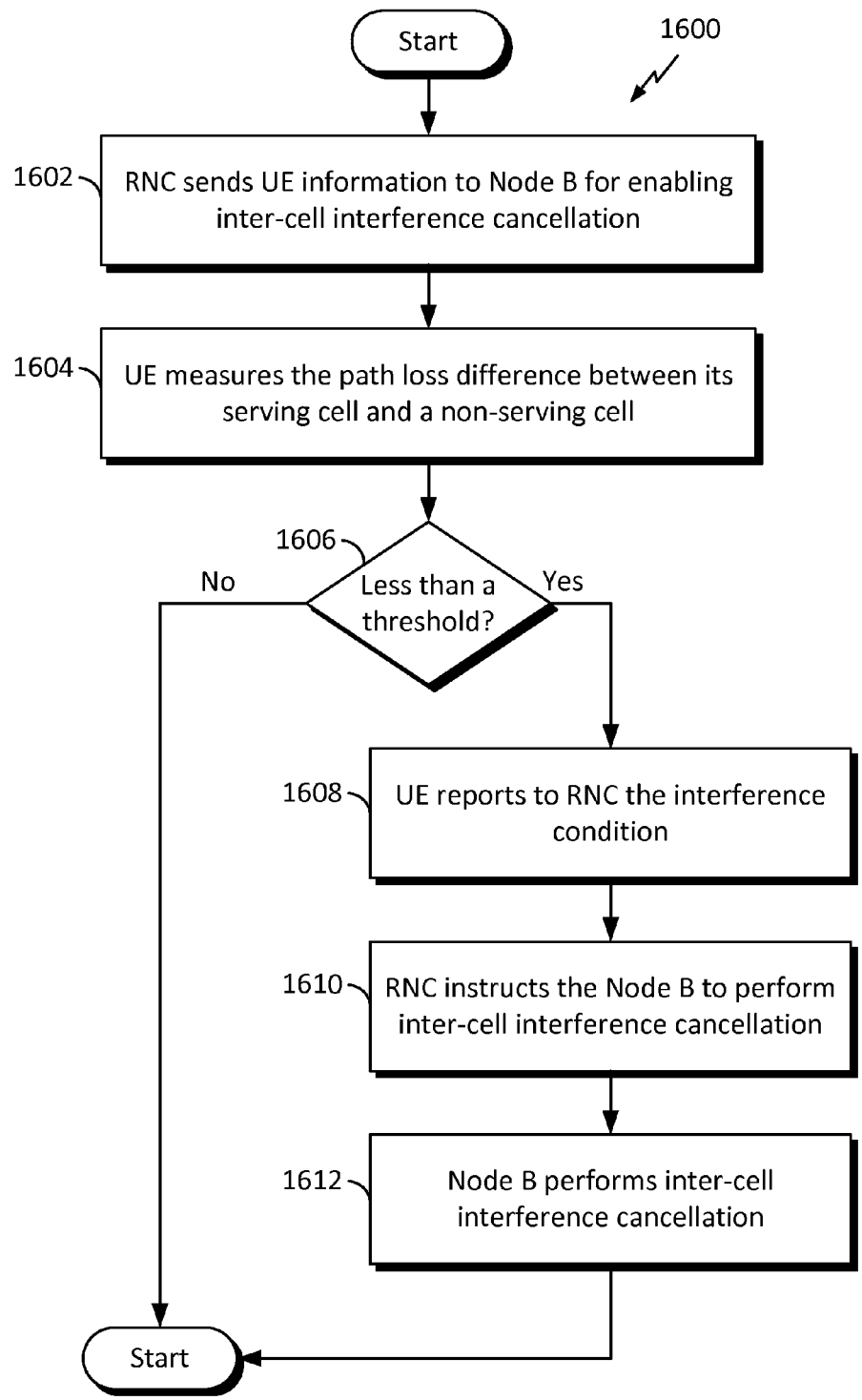
FIG. 16 is a flow chart illustrating an exemplary process of suppressing inter-cell interference at a Node B by applying inter-cell interference cancellation.

FIG. 16 is a flow chart illustrating an exemplary process 1600 as described above for enabling the low-power node to perform inter-cell interference cancellation when the low-power node is otherwise unable to power control the UEs causing the inter-cell interference. In block 1602, the RNC 1218 may transmit information to a Node B, such as the low-power node 1202, relating to one or more UEs for enabling the receiving Node B to perform inter-cell interference cancellation. For example, for a particular UE the RNC 1218 may provide to the Node B one or more of: the UE uplink scrambling code; the uplink DPCCH slot format; the frame offset; the puncture limit; the E-TFCS information; the E-TTI; the E-DPCCH power offset; the maximum number of uplink DPDCHs; and/or the maximum set of E-DPDCHs. With this information, the RNC 1218 may then determine that the low-power Node B is a victim of inter-cell interference that includes transmissions from one or more UEs that do not include the low-power Node B in their active set, and accordingly transmit a signal over a backhaul interface to the low-power Node B to instruct the low-power Node B to suppress the inter-cell interference, e.g., by performing inter-cell interference cancellation on the uplink transmissions from those UEs.

To determine that the low-power Node B is a victim of inter-cell interference, in block 1604, a UE such as the UE 1216 that has as its serving cell the low-power node 1202, may measure a path loss difference between its serving cell and a non-serving neighbor cell, such as the high-power node 1204, and in block 1606 the UE may determine whether the measured path loss difference is less than a suitable threshold. Here, if the path loss difference is small, e.g., below the threshold, it can indicate that the inter-cell interference is high. If the path loss is determined in block 1606 to be less than the threshold, then in block 1608 the UE may report to the RNC 1218 the imbalance condition. Of course, in some examples, the UE may instead simply report path loss information for its serving cell and for the neighbor cell, and the RNC 1218 may determine whether the path loss difference between the two is less than the threshold. In any case, when the RNC 1218 is informed, or determines, that the path loss is less than the threshold, in block 1610 the RNC 1218 may transmit an instruction to the Node B, e.g., the low-power node 1202, to perform inter-cell interference cancellation utilizing the information it received in block 1602. Therefore, in block 1612 the Node B may perform the inter-cell interference cancellation as instructed.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at a user equipment, the method comprising:
   receiving a system information block comprising a channelization code for decoding a common control channel from a non-serving cell not included in an active set of the user equipment;
   receiving a relative grant on the common control channel, in response to a determination that a difference between a first path loss corresponding to a transmission received from a serving cell and a second path loss corresponding to a transmission received from the non-serving cell is less than a threshold; and adjusting an uplink transmit power in accordance with the relative grant received on the common control channel.

2. The method of claim 1, further comprising:
determining the first path loss corresponding to the transmission received from the serving cell;
determining the second path loss corresponding to the transmission received from the non-serving cell; and
determining that the difference between the first path loss and the second path loss is less than the threshold.

3. The method of claim 2, wherein the transmission from the serving cell comprises a first pilot signal and the transmission from the non-serving cell comprises a second pilot signal.

4. The method of claim 3, wherein the system information block comprises a scrambling code corresponding to the non-serving cell, and
wherein the determining of the second path loss comprises utilizing the scrambling code to decode the second pilot signal.

5. The method of claim 1, further comprising:
utilizing the channelization code to decode the common control channel.

6. The method of claim 1, wherein the common control channel comprises a common E-RGCH.

7. A method of wireless communication operable at a user equipment, the method comprising:
camping on a first cell;
transmitting, to a radio network controller (RNC), information relating to a first path loss corresponding to a transmission received from the first cell and a second path loss corresponding to a transmission received from a second cell, wherein the user equipment is not in soft handover with the second cell;
receiving, from the RNC, in response to the transmitted information, a signal based on the first path loss and the second path loss to reduce an uplink transmit power, wherein the signal comprises a maximum uplink transmit power for the user equipment; and
transmitting an uplink transmission in accordance with the signal to reduce the uplink transmit power to fall within the maximum uplink transmit power received.

8. The method of claim 7, further comprising:
determining the first path loss corresponding to the transmission received from the first cell;
determining the second path loss corresponding to the transmission received from the second cell; and
determining a difference between the first path loss and the second path loss,
wherein the information relating to the first path loss and the second path loss comprises the difference between the first path loss and the second path loss.

9. A wireless user equipment, comprising:
at least one processor; and
a memory coupled to the at least one processor,
wherein the at least one processor is configured to:
receive a system information block comprising a channelization code for decoding a common control channel from a non-serving cell not included in an active set of the user equipment;
receive, a relative grant on the common control channel, in response to a determination that a difference between a first path loss corresponding to a transmission received from a serving cell and a second path loss corresponding to a transmission received from the non-serving cell is less than a threshold; and
adjust an uplink transmit power in accordance with the relative grant received on the common control channel.

10. The wireless user equipment of claim 9, wherein the at least one processor is further configured to:
determine the first path loss corresponding to the transmission received from the serving cell;
determine the second path loss corresponding to the transmission received from the non-serving cell; and
determine that the difference between the first path loss and the second path loss is less than the threshold.

11. The wireless user equipment of claim 10, wherein the transmission from the serving cell comprises a first pilot signal and the transmission from the non-serving cell comprises a second pilot signal.

12. The wireless user equipment of claim 11,
wherein the system information block comprises a scrambling code corresponding to the non-serving cell, and
wherein, for determining the second path loss, the at least one processor is further configured to utilize the scrambling code to decode the second pilot signal.

13. The wireless user equipment of claim 9, wherein the at least one processor is further configured to:
utilize the channelization code to decode the common control channel.

14. The wireless user equipment of claim 9, wherein the common control channel comprises a common E-RGCH.

15. A wireless user equipment, comprising:
at least one processor; and
a memory coupled to the at least one processor,
wherein the at least one processor is configured to:
camp on a first cell;
transmit, to a radio network controller (RNC), information relating to a first path loss corresponding to a transmission received from the first cell and a second path loss corresponding to a transmission received from a second cell, wherein the user equipment is not in soft handover with the second cell;
receive, from the RNC, in response to the transmitted information, a signal based on the first path loss and the second path loss to reduce an uplink transmit power, wherein the signal comprises a maximum uplink transmit power for the user equipment; and
transmit an uplink transmission in accordance with the signal to reduce the uplink transmit power to fall within the maximum uplink transmit power.

16. The wireless user equipment of claim 15, wherein the at least one processor is further configured to:
determine the first path loss corresponding to the transmission received from the first cell;
determine the second path loss corresponding to the transmission received from the second cell; and
determine a difference between the first path loss and the second path loss,
wherein the information relating to the first path loss and the second path loss comprises the difference between the first path loss and the second path loss.

17. A wireless user equipment, comprising:
means for receiving a system information block comprising a channelization code for decoding a common control channel from a non-serving cell not included in an active set of the user equipment;
means for receiving a relative grant on the common control channel, in response to a determination that a difference between a first path loss corresponding to a transmission received from a serving cell and a second path loss corresponding to a transmission received from the non-serving cell is less than a threshold; and means for controlling an uplink transmit power in accordance with the relative grant received on the common control channel.

18. A wireless user equipment, comprising:

means for camping on a first cell;

means for transmitting, to a radio network controller (RNC), information relating to a first path loss corresponding to a transmission received from the first cell and a second path loss corresponding to a transmission received from a second cell, wherein the user equipment is not in soft handover with the second cell;

means for receiving, from the RNC, in response to the transmitted information, a signal based on the first path loss and the second path loss to reduce an uplink transmit power, wherein the signal comprises a maximum uplink transmit power for the user equipment; and means for transmitting an uplink transmission in accordance with the signal to reduce the uplink transmit power to fall within the maximum uplink transmit power.

\* \* \* \* \*